US012104936B2

(12) United States Patent
Xie

(10) Patent No.: US 12,104,936 B2
(45) Date of Patent: Oct. 1, 2024

(54) APPARATUS FOR MEASURING MULTIPHASE FLUID FLOWS AND RELATED METHODS

(71) Applicant: Schlumberger Technology Corporation, Sugar Land, TX (US)

(72) Inventor: Cheng-Gang Xie, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 746 days.

(21) Appl. No.: 17/253,331

(22) PCT Filed: Jun. 27, 2018

(86) PCT No.: PCT/US2018/039647
§ 371 (c)(1),
(2) Date: Dec. 17, 2020

(87) PCT Pub. No.: WO2020/005217
PCT Pub. Date: Jan. 2, 2020

(65) Prior Publication Data
US 2021/0270647 A1 Sep. 2, 2021

(51) Int. Cl.
*G01F 1/44* (2006.01)
*G01F 1/66* (2022.01)
(Continued)

(52) U.S. Cl.
CPC .............. *G01F 1/662* (2013.01); *G01F 1/44* (2013.01); *G01F 1/7088* (2013.01); *G01F 15/02* (2013.01); *G01N 22/00* (2013.01); *G01F 1/712* (2013.01)

(58) Field of Classification Search
CPC ........... G01F 1/662; G01F 1/44; G01N 22/00; G01N 24/10; G01R 33/543;
(Continued)

(56) References Cited

U.S. PATENT DOCUMENTS 4,423,623 A * 1/1984 Ho .................... G01N 22/00
73/61.41
5,361,632 A * 11/1994 Magnani ................ G01F 1/86
73/19.1
(Continued)

OTHER PUBLICATIONS

Pirrone M, Bona N, Galli M T, Pampuri F, Faivre O, Han M, Hizem M and Mosse L "An innovative dielectric dispersion measurement for better evaluation of thin layered reservoirs applied in a south Italy well". 10th Offshore Mediterranean Conference, Ravenna, Italy, Mar. 23-25, 2011.
(Continued)

*Primary Examiner* — Jermele M Hollington
*Assistant Examiner* — Taqi R Nasir
(74) *Attorney, Agent, or Firm* — Trevor G. Grove

(57) ABSTRACT

Apparatus for measuring multiphase fluid flows and related methods are disclosed herein. An example apparatus includes a fluid conduit to provide a flow path for a fluid, a first antenna coupled to the fluid conduit, and a second antenna coupled to the fluid conduit. The second antenna is to generate first signal data based on a first signal emitted by the first antenna. The example apparatus includes a third antenna coupled to the fluid conduit. The third antenna is to generate second signal data based on a second signal emitted by the first antenna. The first antenna, the second antenna, and the third antenna are disposed in a linear array relative to an axis of the fluid conduit. The example apparatus includes a processor to determine one or more of a permittivity or a conductivity of the fluid based on the first signal data and the second signal data.

23 Claims, 7 Drawing Sheets

(51) Int. Cl.
*G01F 1/7088* (2022.01)
*G01F 15/02* (2006.01)
*G01N 22/00* (2006.01)
*G01F 1/712* (2006.01)

(58) Field of Classification Search
CPC ............ G01R 33/5608; G01R 33/4828; G01R 33/3415; G01R 33/283; G01R 33/307; G01R 33/60; G01V 3/32; E21B 49/08; E21B 2049/085
See application file for complete search history.

(56) References Cited

U.S. PATENT DOCUMENTS

| | | | |
|---|---|---|---|
| 5,453,693 A * | 9/1995 | Sinclair | G01V 3/30 324/338 |
| 6,831,470 B2 | 12/2004 | Xie et al. | |
| 8,536,883 B2 | 9/2013 | Xie et al. | |
| 9,645,130 B2 | 5/2017 | Xie et al. | |
| 2008/0295609 A1 | 12/2008 | Xie | |
| 2008/0319685 A1 * | 12/2008 | Xie | G01N 9/24 356/70 |
| 2009/0126502 A1 | 5/2009 | Wee et al. | |
| 2013/0105224 A1 * | 5/2013 | Donderici | G01V 3/12 175/45 |
| 2014/0331783 A1 | 11/2014 | Xie | |
| 2015/0260669 A1 | 9/2015 | Bittar et al. | |
| 2017/0212024 A1 | 7/2017 | Hunt et al. | |
| 2020/0362350 A1 * | 11/2020 | Sliz | A61K 31/713 |

OTHER PUBLICATIONS

International Search Report and Written Opinion issued in PCT Application PCT/US2018/039647, dated Mar. 26, 2019 (18 pages).

* cited by examiner

APPARATUS FOR MEASURING MULTIPHASE FLUID FLOWS AND RELATED METHODS

BACKGROUND

This disclosure relates generally to multiphase fluids and, more particularly, to apparatus for measuring multiphase fluid flows and related methods.

DESCRIPTION OF THE RELATED ART

Properties of a multiphase fluid (e.g., including oil, gas, water, and/or solids) flowing through a pipe, such as flow rates of the individual phases, can be used to characterize oil and gas production. Flow properties such as phase holdup and phase velocity may be determined based on measurements of electrical properties of the fluid, such as permittivity and/or conductivity. Transmission attenuation and phase shift of electromagnetic waves (e.g., microwaves) between transmitters and receivers (e.g., microwave antennas) may be measured to determine properties of the fluid flow due to the high contrast in permittivity and conductivity of water in the multiphase fluid as compared to other phases (e.g., oil, gas). In some known examples, a plurality of electromagnetic transmitters and receivers are disposed in a circular array about a periphery of a pipe at cross-section of the pipe to estimate flow mixture permittivity and/or conductivity.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

An example apparatus includes a conduit to provide a flow path for a fluid, a first antenna coupled to the fluid conduit, and a second antenna coupled to the fluid conduit. The second antenna is to generate first signal data based on a first signal emitted by the first antenna. The example apparatus includes a third antenna coupled to the fluid conduit. The third antenna is to generate second signal data based on a second signal emitted by the first antenna. The first antenna, the second antenna, and the third antenna are disposed in a linear array relative to an axis of the fluid conduit. The example apparatus includes a processor. The first antenna, the second antenna, and the third antenna are to be communicatively coupled to the processor. The processor is to determine one or more of a permittivity or a conductivity of the fluid based on the first signal data and the second signal data.

Another example apparatus includes a processor programmed to implement a calculator to calculate a measured amplitude attenuation data and phase shift data based on signal data received from a plurality of antennas coupled to a conduit during flow of a multiphase fluid through the conduit. The plurality of antennas is coupled to the conduit along an axis of the conduit. The example apparatus includes a forward modeler and an inverse modeler in communication with the forward modeler. The inverse modeler is to determine one or more of a permittivity or a conductivity of the multiphase fluid by minimizing a difference between the measured amplitude attenuation data and phase shift data and modeled amplitude attenuation data and phase shift data generated by the forward modeler.

Another example apparatus includes a first transmitting antenna and a second transmitting antenna coupled to a pipe along an axis of the pipe. The example apparatus includes a first receiving antenna and a second receiving antenna coupled to the pipe along the axis of the pipe. The first receiving antenna is to receive a first signal at a first spacing from the first transmitting antenna. The second receiving antenna is to receive a second signal at a second spacing from the first transmitting antenna. The first receiving antenna is to receive a third signal at the second spacing from the second transmitting antenna. The second receiving antenna is to receive a fourth signal at the first spacing from the second transmitting antenna. The first spacing is different from the second spacing. The example apparatus includes a processor. The first transmitting antenna, the second transmitting antenna, the first receiving antenna, and the second receiving antenna are to be communicatively coupled to the processor. The processor is to determine a property of a multiphase fluid flowing through the pipe based on the first signal, the second signal, the third signal, and the fourth signal.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended to familiarize the reader with certain aspects and contexts of some embodiments without limitation to the claimed subject matter.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
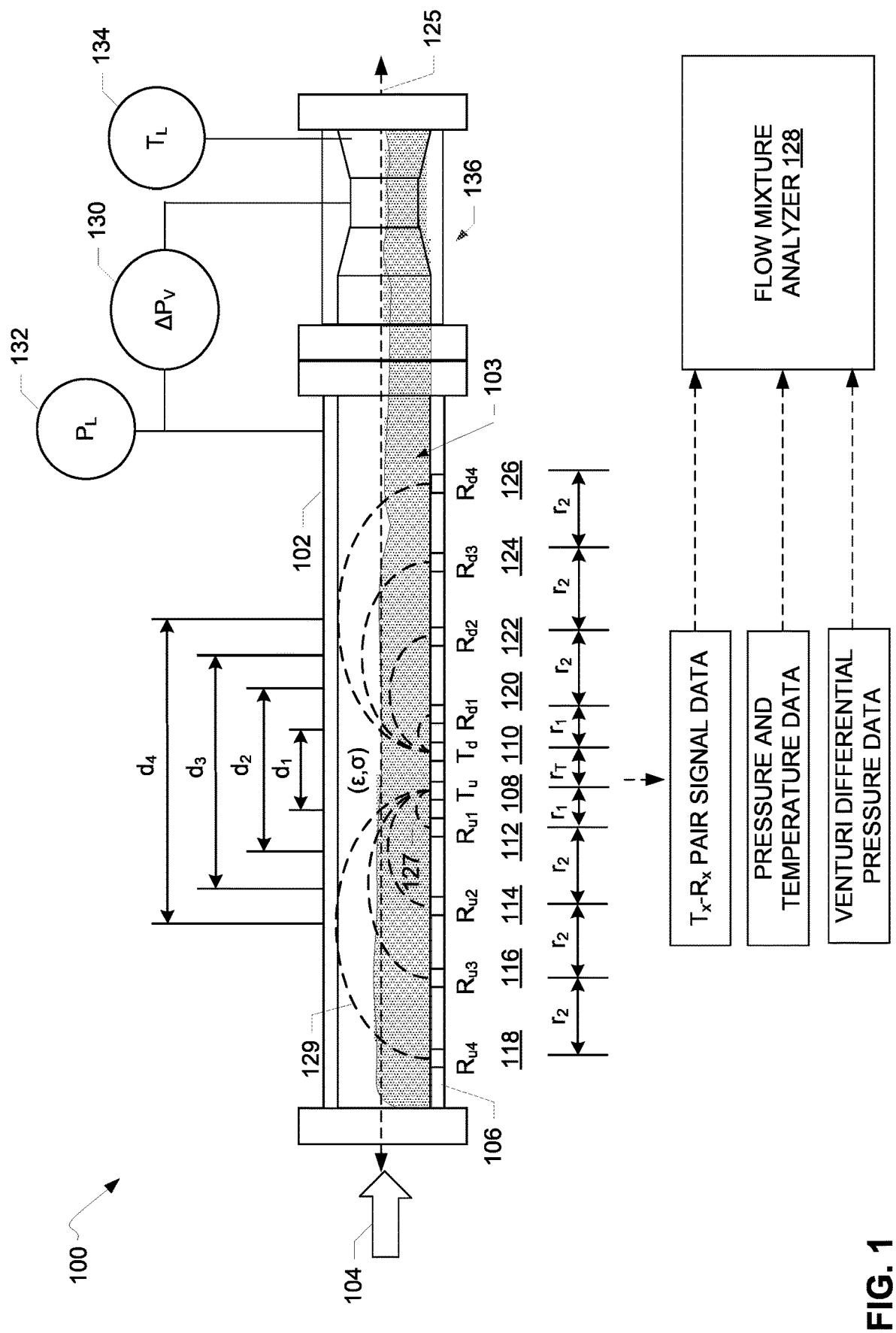
FIG. 1 illustrates an example system for analyzing fluid flows constructed in accordance with teachings disclosed herein.

It is to be understood that the present disclosure provides many different embodiments, or examples, for implementing different features of various embodiments. Specific examples of components and arrangements are described below for purposes of explanation and to simplify the present disclosure. These are, of course, merely examples and are not intended to be limiting.

When introducing elements of various embodiments, the articles "a," "an," and "the" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not mandate any particular orientation of the components.

Flow of multiphase fluid (e.g., including oil, gas, water and, in some examples, solids) can change over time and space as the fluid flows through, for example, a conduit such as a pipe. For example, as the multiphase fluid reaches the surface, gas may expand and/or come out of a liquid in the multiphase fluid due to pressure reduction, causing changes in gas volume fraction (GVF). Changes in one phase of the fluid can affect changes in flow properties of the other phases, such as individual phase flow rates, and/or can affect the overall flow regime. Further, flow behavior of multiphase fluids can differ depending on an orientation of the pipe in which the fluid is flowing (e.g., a horizontally orientated pipe, a vertically orientated pipe). For example, a multiphase fluid flowing through a horizontally oriented pipe can be substantially stratified while a multiphase fluid flowing through a vertically orientated pipe can include gas flowing through the center of the pipe with liquid surrounding the gas. Thus, measuring properties of a multiphase fluid flow presents challenges as compared to measuring properties of a single-phase fluid and/or measuring properties downhole for static formations.

Electromagnetic waves (e.g., microwaves) transmitted across, for instance, a cross-section of a pipe can be used to detect electrical properties of the fluid flowing therein due to the high contrast in permittivity and conductivity of water as compared to other phases of the fluid (e.g. oil and gas). Signal data generated from the transmission of electromagnetic waves between transmitting and receiving antennas can be analyzed with respect to amplitude attenuation and phase shifts (e.g., due to the presence, distribution, holdup and conductivity of water) detected at the cross-section. The signal data can be used to determine flow mixture permittivity and conductivity, water conductivity, water holdup, liquid holdup, and/or water-in-liquid ratio (WLR).

Examples disclosed herein provide for multiphase fluid flow measurements of multiphase fluid flowing in a substantially horizontally oriented or in a substantially vertically oriented pipe based on signal data generated by radio frequency (RF)/microwave transmitting and receiving antenna pairs disposed in a linear array along a wall of the pipe. The antenna pairs can be formed by receivers disposed at different distances along an axis of the pipe relative to the transmitters. Some of the antennas can be disposed proximate to upstream flow paths of the fluid and some of the antennas can be disposed proximate to downstream flows of the fluid. Signal data generated between transmitter-receiver antenna pairs in which the receiver is disposed proximate to (e.g., near) the transmitter can be used to measure shallowly into the pipe relative to the pipe wall. Signal data generated between transmitter-receiver antenna pairs in which the receiver is disposed distal to (e.g., farther from) the transmitter can be used to measure deeper into the pipe relative to the pipe wall.

In examples disclosed herein, amplitude attenuation data and phase shift data detected from the signal data can be used to determine fluid mixture permittivity and/or conductivity. Some examples disclosed herein utilize an optimization process to determine fluid mixture permittivity and conductivity based on a forward model (e.g., an optimization model) that learns from the signal data generated by the transmitting and receiving antenna pairs and the resulting fluid mixture permittivity and conductivity parameters derived from the signal data. In examples disclosed herein, the permittivity and conductivity parameters can be used to determine other fluid properties such as water-in-liquid ratio, salinity, and liquid holdup.

In some examples disclosed herein, cross-correlation between signals generated between downstream and upstream transmitter-receiver pairs, where the receivers are disposed proximate to (e.g., near) the respective transmitters along the pipe axis, can be used to determine liquid flow velocities. Cross-correlation between signals generated between downstream and upstream transmitter-receiver pairs, where the receivers are disposed distal to (e.g., relatively far from) the respective transmitters along the pipe axis, can be used to determine gas slug velocity. Thus, in examples disclosed herein, the linear array of transmitters and receivers spaced along the pipe axis can be used to generate signal data indicative of a variety of fluid properties at different locations and at different times as the fluid flows through the pipe.

FIG. 1 illustrates an example system 100 including a fluid conduit (e.g., a flow pipe) 102 disposed in a horizontal configuration. The example flow pipe 102 of FIG. 1 includes a metallic material forming a wall of the flow pipe 102. A fluid 103 flows through the flow pipe 102 in a direction of arrow 104 of FIG. 1. The fluid 103 can be a multiphase fluid including, for instance, oil, gas, and water phases. The fluid 103 can have a substantially stratified or layered flow as the fluid 103 flows through the horizontally orientated flow pipe 102. The fluid 103 can have other type of flow regimes such as gas-liquid bubbly flow or slug flow as the fluid 103 flows through the horizontally orientated flow pipe 102.

The flow pipe 102 includes a plurality of radio frequency (RF)/microwave transmitting antennas $T_x$ and receiving antennas Rx coupled to a wall 106 of the flow pipe 102 such that the antennas are disposed along an axis of the horizontally oriented flow pipe 102. In some examples, dielectric windows of the antennas are substantially flush with the pipe wall 106. The transmitting antennas include a first electromagnetic transmitter 108 ($T_u$) and a second electromagnetic transmitter 110 ($T_d$). The first and second electromagnetic transmitters 108, 110 emit signals at one or more RF and/or microwave frequencies and, in some examples, emit the signals sequentially. The receiving antennas coupled to the flow pipe 102 include a first electromagnetic receiver 112 ($R_{u1}$), a second electromagnetic receiver 114 ($R_{u2}$), a third electromagnetic receiver 116 ($R_{u3}$), and a fourth electromagnetic receiver 118 ($R_{u4}$), where the first through fourth electromagnetic receivers 112, 114, 116, 118 receive (e.g., simultaneously) the signals transmitted by the first electromagnetic transmitter 108 at one or more RF and/or microwave frequencies. The antennas coupled to the flow pipe 102 include a fifth electromagnetic receiver 120 ($R_{d1}$), a sixth electromagnetic receiver 122 ($R_{d2}$), a seventh electromagnetic receiver 124 ($R_{d3}$), and an eighth electromagnetic receiver 126 ($R_{d4}$), where the fifth through eighth electromagnetic receivers 120, 122, 124, 126 receive (e.g., simultaneously) the signal transmitted by the second electromagnetic transmitter 110 at one or more RF and/or microwave frequencies.

In other examples, the first through eighth electromagnetic receivers 112, 114, 116, 118, 120, 122, 124, 126 can receive (e.g., simultaneously) the signals transmitted by the first electromagnetic transmitter 108 or the signals transmitted by the second electromagnetic transmitter 110, at one or more RF and/or microwave frequencies. For instance, the first electromagnetic receiver 112 ($R_{u1}$) can receive a signal transmitted by the second electromagnetic transmitter 110 ($T_d$). As another example, the sixth electromagnetic receiver 122 ($R_{d2}$) can receive a signal transmitted by the first electromagnetic transmitter 108 ($T_u$).

As illustrated in FIG. 1, the transmitters 108, 110 and the receivers 112, 114, 116, 118, 120, 122, 124, 126 are coupled to the pipe wall 106 along an axis of the pipe. Put another way, the transmitters 108, 110 and the receivers 112, 114, 116, 118, 120, 122, 124, 126 are disposed in a linear array relative to a longitudinal axis 125 of the flow pipe 102. In the example of FIG. 1, the transmitters 108, 110 and the receivers 112, 114, 116, 118, 120, 122, 124, 126 can be coupled to an underside surface of flow pipe 102. The transmitters 108, 110 and the receivers 112, 114, 116, 118, 120, 122, 124, 126 can be coupled to other portions of the pipe wall 106 and/or coupled to the pipe wall 106 in a different arrangement from that shown in FIG. 1. Also, the flow pipe 102 can include additional or fewer transmitters and/or receivers than shown in FIG. 1.

In the example of FIG. 1, the first electromagnetic transmitter 108 and the first through fourth electromagnetic receivers 112, 114, 116, 118 are coupled to the flow pipe 102 proximate to an upstream flow of the multiphase fluid 103 through the flow pipe 102. For ease of discussion, the first electromagnetic transmitter 108 will be referred to herein as $T_u$ and the first through fourth electromagnetic receivers 112, 114, 116, 118 will be referred to as $R_{u1}$, $R_{u2}$, $R_{u3}$, $R_{u4}$, respectively. In the example of FIG. 1, the second electromagnetic transmitter 110 and the fifth through eighth electromagnetic receivers 120, 122, 124, 126 are coupled to the flow pipe 102 proximate to a downstream flow of the multiphase fluid 103 through the flow pipe 102. For ease of discussion, the second electromagnetic transmitter 108 will be referred to herein as Ta and the fifth through eighth electromagnetic receivers 120, 122, 124, 126 will be referred to as $R_{d1}$, $R_{d2}$, $R_{d3}$, $R_{d4}$, respectively.

As shown in FIG. 1, the first electromagnetic receiver $R_{u1}$ is spaced apart a first distance $r_1$ (e.g., a near distance) from the first electromagnetic transmitter $T_u$. The first electromagnetic transmitter $T_u$ and the first electromagnetic receiver $R_{u1}$ form a first transmitting-receiving antenna pair $T_u$-$R_{u1}$. The second electromagnetic receiver $R_{u2}$ is spaced apart a second distance ($r_1+r_2$) (e.g., a medium distance) from the first electromagnetic transmitter $T_u$. The first electromagnetic transmitter $T_u$ and the second electromagnetic receiver $R_{u2}$ form a second transmitting-receiving antenna pair $T_u$-$R_{u2}$. Similarly, as shown in FIG. 1, the third electromagnetic receiver $R_{u3}$ is spaced apart a third distance $r_1+2r_2$ (e.g., a far distance) from the first electromagnetic transmitter $R_{u1}$ and forms a third transmitting-receiving antenna pair $T_u$-$R_{u3}$ with the first electromagnetic transmitter $T_u$. Also, the fourth electromagnetic receiver $R_{u4}$ is spaced apart a fourth distance $r_1+3r_2$ (e.g., a very far distance) from the first electromagnetic transmitter $T_u$ and forms a fourth transmitting-receiving antenna pair $T_u$-$R_{u4}$ with the first electromagnetic transmitter $T_u$. As an example, $r_1$ can have a value of 38 mm and $r_2$ can have a value of 26 mm.

As a result of the near, medium, far, and very far spacings of the receivers $R_{u1}$, $R_{u2}$, $R_{u3}$, $R_{u4}$ relative to the transmitter $T_u$, the signals (e.g., electromagnetic waves) emitted by the electromagnetic transmitter $T_u$ travel different distances relative to a depth of the flow pipe 102 and, thus, the fluid flowing therein. For example, as represented by curved lines 127, 129 in FIG. 1, a signal emitted by the first electromagnetic transmitter $T_u$ and received by the first electromagnetic receiver $R_{u1}$ travels less distance relative to a depth (inner diameter) of the pipe (e.g., a shallow distance) as compared to a signal emitted by the first electromagnetic transmitter $T_u$ that travels more distance relative to the depth of the pipe and is received by the fourth electromagnetic receiver $R_{u4}$. Thus, the different spacings of the electromagnetic receivers provide for measurements of the fluid near the wall region 106 at which the antennas are coupled as well as the fluid across a wider region (including central region) of the flow pipe 102.

As also shown in FIG. 1, the fifth, sixth, seventh, and eighth electromagnetic receivers $R_{d1}$, $R_{d2}$, $R_{d3}$, $R_{d4}$ are spaced apart from the second electromagnetic transmitter $T_d$ substantially as disclosed above in connection with the spacing of the first, second, third, and fourth electromagnetic receivers $R_{u1}$, $R_{u2}$, $R_{u3}$, $R_{u4}$ relative to the first electromagnetic transmitter $T_u$ (e.g., near, medium, far, very far). As also disclosed above in connection with the first through fourth electromagnetic receivers $R_{u1}$, $R_{u2}$, $R_{u3}$, $R_{u4}$ and the first electromagnetic transmitter $T_u$, each of the fifth, sixth, seventh, and eighth electromagnetic receivers $R_{d1}$, $R_{d2}$, $R_{d3}$, $R_{d4}$ forms a respective transmitting-receiving antenna pair $T_d$-$R_{d1}$, $T_d$-$R_{d2}$, $T_d$-$R_{d3}$, $T_d$-$R_{d4}$ with the second electromagnetic transmitter $T_d$. The different spacings of the fifth through eighth electromagnetic receivers $R_{d1}$, $R_{d2}$, $R_{d3}$, $R_{d4}$ enables signal data to be generated for different vertical and lateral distances relative to the pipe depth of a fluid flowing through the flow pipe 102 due to the different travel paths of the signals.

In some examples, the transmitter(s) $T_x$ and the electromagnetic receiver(s) Rx include antennas having longitudinal magnetic dipoles such that antenna current probes are disposed along the linear array of the transmitter(s) and receivers (e.g., along a longitudinal axis of the flow pipe 102 of FIG. 1). In some other examples, the transmitter(s) $T_x$ and the electromagnetic receiver(s) Rx include antennas having traverse magnetic dipoles such that the antenna current probes are disposed orthogonal to the linear array of the transmitter(s) and receivers (e.g., orthogonal to the longitudinal axis of the flow pipe 102 of FIG. 1). The example transmitter(s) $T_x$ and/or the electromagnetic receiver(s) Rx of FIG. 1 can include other types of antennas, including electric dipoles, cross magnetic dipoles, etc.

In the example system 100, signal data is rapidly (e.g., every 0.1 ms) generated by the respective upstream and downstream transmitter-receiver pairs $T_u$-$R_{u1}$ and $T_d$-$R_{di}$ as a result of signals (e.g., electromagnetic waves) transmitted and received between the antenna pairs at one or more frequencies in the RF and/or microwave frequency spectrum. The signal transmissions between (a) the upstream transmitter $T_u$ and any of the upstream receivers $R_{u1}$ or any of the downstream receivers $R_{di}$; and (b) the downstream transmitter $T_d$ and any of the downstream receivers $R_{di}$ or any of the upstream receivers $R_{u1}$ can be simultaneous or substantially simultaneous. The transmitting RF and/or microwave signals can have a frequency of, for instance, 100 MHz to 3 GHZ. In the example of FIG. 1, the signal data generated by each of transmitter-receiver pairs $T_x$-$R_x$ is transmitted to a flow mixture analyzer 128. The signal data can be transmitted to the flow mixture analyzer 128 via one or more wired or wireless connections. The example flow mixture analyzer 128 can be implemented by one or more processors.

As disclosed herein, the flow mixture analyzer 128 of FIG. 1 uses the signal data generated by the transmitter-receiver pairs $T_x$-$R_x$ to generate multiphase-flow mixture amplitude-attenuation (AT) data, or data indicative of attenuation of an electromagnetic wave emitted by a transmitter $T_u$, $T_d$, and received by a corresponding receiver $R_{u1}$, $R_{di}$. The flow mixture analyzer 128 of FIG. 1 uses the signal data generated by the transmitter-receiver pairs $T_x$-$R_x$ to generate multiphase-flow mixture phase shift (PS) data with respect to the electromagnetic waves measured by the correspondingly spaced apart receivers. Based on the AT and PS data, the flow mixture analyzer 128 determines a distribution profile of flow mixture permittivity ($\varepsilon$) and/or flow mixture conductivity ($\sigma$) of a multiphase fluid including, for example water, oil, gas, and/or solids at different axial locations along the flow pipe 102 (e.g., along a longitudinal axis of the flow pipe 102). As disclosed herein, the flow mixture permittivity and conductivity distribution profile ($\varepsilon$, $\sigma$) may be determined from the measured (AT, PS) data using an electromagnetic inversion process. The distribution profile may be indicative of permittivity and conductivity ($\varepsilon$, $\sigma$) for a stratified flow distribution including water, oil, and gas, or a stratified flow distribution including liquid and gas where oil and water are substantially well mixed.

The distribution profile of flow mixture permittivity ($\varepsilon$) and/or conductivity ($\sigma$) parameters can be used by the example flow mixture analyzer 128 of FIG. 1 to determine other properties of the multiphase fluid 103 such as the distribution profiles of liquid holdup ($\alpha_{liquid}$) and of the water-to-liquid ratio (WLR), and their respective average values by using an appropriate spatial integration, at each of a short signal data generation interval. The flow mixture analyzer 128 can use the flow mixture permittivity and conductivity data ($\varepsilon$, $\sigma$) to determine brine conductivity and, thus, salinity of the fluid 103. In some examples disclosed herein, liquid holdup and WLR measurements are determined in substantially real time and substantially independent of salinity of the fluid.

As represented in FIG. 1, respective axial spacings of the near transmitter-receiver pairs $T_u$-$R_{u1}$ and $T_d$-$R_{d1}$, the medium transmitter-receiver pairs $T_u$-$R_{u2}$ and $T_d$-$R_{d2}$, the far transmitter-receiver pairs $T_u$-$R_{u3}$ and $T_d$-$R_{d3}$, and the very far transmitter-receiver pairs $T_u$-$R_{u4}$ and $T_d$-$R_{d4}$ may be expressed as:

$$d_1 = r_1 + r_T \quad (1)$$

$$d_2 = 2r_1 + r_T + r_2 \quad (2)$$

$$d_3 = 2r_1 + r_T + 3r_2 \quad (3); \text{ and}$$

$$d_4 = 2r_1 + r_T + 5r_2 \quad (4).$$

As disclosed herein, the axial spacings $d_1$, $d_2$, $d_3$, $d_4$ (where the axial spacings of the transmitters can have a value of, for example, $r_T = 26$ mm) can be used to calculate flow velocities of the multiphase fluid 103. In particular, cross correlations of the signals between corresponding axially spaced transmitter-receiver pairs (e.g., $T_u$-$R_{u1}$, $T_d$-$R_{d1}$) are used by the flow mixture analyzer 128 to track time delays between the signals at upstream and downstream receivers as the multiphase fluid 103 flows through the flow pipe 102 and to calculate flow velocities of the multiphase fluid 103.

In some examples, the system 100 of FIG. 1 includes a modular venturi 136 coupled to the flow pipe 102. As shown in FIG. 1, the modular venturi 136 can be disposed downstream of the transmitting and receiving antennas $T_x$, $R_x$. In some examples, the fluid 103 is at non-slug flow regime or at near single-phase bubbly or mist flow regime; when the fluid 103 encounters such a flow regime, the modular venturi 136 is used to determine flow rate of the fluid 103. A differential pressure $\Delta P_V$ can be measured by a differential pressure sensor 130 across the modular venturi 136. As discussed herein, the flow mixture analyzer 128 can use the differential pressure $\Delta P_V$ to determine a total flow rate measurement for the multiphase fluid 103.

In some examples, the system 100 of FIG. 1 can include one or more pressure sensors 132 to measure line pressure ($P_L$) and one or more temperature sensors 134 to measure line temperature ($T_L$) of the fluid 103. The line pressure and line temperature can be provided as inputs to the flow mixture analyzer 128 to convert the flow rate values from line conditions (at the measured pressure $P_L$ and temperature $T_L$) to standard conditions (i.e., at a standard ambient pressure 101.325 kPa and a standard temperature 15 degree Celsius). A single multi-variable transmitter may be used to perform the (three) measurements of differential pressure, pressure and temperature.

Figure 2:
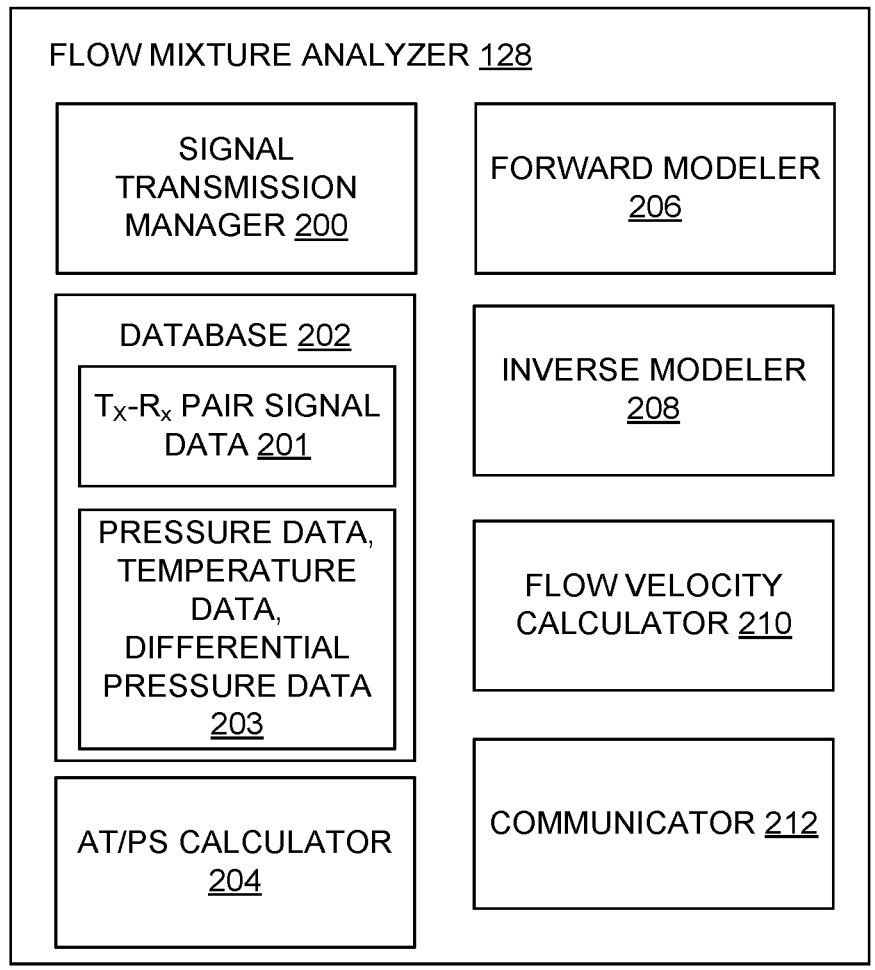
FIG. 2 is a block diagram of an example flow mixture analyzer that may be used to implement the example systems disclosed herein.

FIG. 2 is a block diagram of the example flow mixture analyzer 128 of FIG. 1. The flow mixture analyzer 128 of FIG. 2 includes a signal transmission manager 200. The signal transmission manager 200 controls the emission of signals from the transmitting antennas $T_u$, $T_d$ for receipt by the respective receiving antennas $R_{u1}$, $R_{di}$. The signal transmission manager 200 can control, for example, the selection of magnetic-dipole orientation (longitudinal or transverse) and/or that of the RF/microwave frequency at which the signals are emitted, the time and duration at which the signals are emitted and/or received, etc. based on one or more user settings received at the flow mixture analyzer 128. Sensor electronics associated with the signal transmission manager 200 pre-process the received signals from the selected transmitter-receiver pairs $T_x$-$R_x$, at the selected magnetic-dipole orientation(s) and RF frequencies. Pre-processing the received RF signals may include in-phase signal and quadrature-phase signal demodulations, resulting in the generation of $T_x$-$R_x$ signals (201) at a much reduced intermediate frequency (e.g., IF=10 kHz) for transmission and further processing.

The flow mixture analyzer 128 includes a database 202 to store signal data 201 generated by the transmitter-receiver pairs $T_x$-$R_x$ and transmitted to the flow mixture analyzer 128. The example database 202 can also store pressure, temperature and differential pressure data 203 measured by, for instance, the pressure sensor 132, the temperature sensor 134, and the differential pressure sensor 130.

The flow mixture analyzer 128 of FIG. 2 includes an amplitude attenuation (AT) and phase shift (PS) calculator 204. The example AT/PS calculator 204 determines amplitude attenuation and phase shift measurements with respect to the signal data 201 generated by the transmitter-receiver pairs $T_x$-$R_x$. The example AT/PS calculator 204 can calculate the (AT, PS) measurements substantially as disclosed in U.S. Pat. No. 8,536,883, which is hereby incorporated by reference. In the example of FIG. 2, the AT/PS calculator can determine compensated differential (AT, PS) measurements that are substantially independent of the effects of drifts or variations in gain at the electrical transmitting and/or receiving antenna(s) over time and/or due to temperature, as also disclosed in U.S. Pat. No. 8,536,883. Thus, in the example of FIG. 2, data generated from the (AT, PS) data (e.g., flow mixture permittivity and/or conductivity ($\varepsilon$, $\sigma$), WLR, liquid holdup, etc.) is also substantially immune from the effects of gain levels in electronics related to the transmitters and/or receivers $T_x$, $R_x$ drifting over time. At least two transmitters and two receivers, with two substantially different transmitter-receiver spacings, are required to calculate one set of compensated differential (AT, PS) data by the AT/PS calculator 204.

As an example, referring to FIG. 1, the transmitter-receiver pair $T_u$-Ru is disposed at a first spacing $r_1$ and the transmitter-receiver pair $T_u$-$R_{d1}$ is at a second spacing $r_T+r_1$. Also, the transmitter-receiver pair $T_d$-$R_{d1}$ is at the first spacing $r_1$ and the transmitter-receiver pair $T_d$-$R_{u1}$ is at the second spacing $r_T+r_1$. Thus, the AT/PS calculator 204 can determine a set of compensated differential (AT, PS) data based on the $T_u$-$R_{u1}$, $T_u$-$R_{d1}$, $T_d$-$R_{d1}$, $T_d$-$R_{u1}$ transmitter-receiver pairs. As another example, the transmitter-receiver pair $T_u$-$R_{u2}$ is disposed at a first spacing $2r1$ and the transmitter-receiver pair $T_u$-$R_{d2}$ is at a second spacing $r_T+2r_1$. Also, the transmitter-receiver pair $T_d$-$R_{d2}$ is at the first spacing $2r1$ and the transmitter-receiver pair $T_d$-$R_{u2}$ is at the second spacing $r_T+2r_1$. Thus, the AT/PS calculator 204 can determine a set of compensated differential (AT, PS) data based on the $T_u$-$R_{u2}$, $T_u$-$R_{d2}$, $T_d$-$R_{d2}$, $T_d$-$R_{u2}$ transmitter-receiver pairs. In the example of FIG. 1, for each selected RF/microwave frequency and magnetic-dipole orientation, the upstream transmitter $T_u$ and the related upstream receivers $R_{u1}$, $R_{u2}$, $R_{u3}$, $R_{u4}$ (with near spacing ($r_1$), medium spacing ($r_1+r_2$), far spacing ($r_1+2r_2$), and very-far spacing ($r_1+3r_2$)), and the downstream transmitter $T_d$ and the related downstream receivers $R_{d1}$, $R_{d2}$, $R_{d3}$, $R_{d4}$ (with the matching near spacing ($r_1$), medium spacing ($r_1+r_2$), far spacing ($r_1+2r_2$), and very far spacing ($r_1+3r_2$)), the AT/PS calculator 204 can calculate at least four sets of compensated differential (AT, PS) dataset, for five different lateral distances with respect to the depth of the flow pipe 102. Flow mixture permittivity and/or conductivity ($\varepsilon$, $\sigma$) distribution profile may be determined from a plurality of multiple (e.g., four) set of compensated differential (AT, PS) datasets.

The flow mixture analyzer 128 of FIG. 2 includes a forward modeler 206 and an inverse modeler 208. As disclosed herein, the forward modeler 206 uses a first forward model to characterize or predict the (AT, PS) measurements based on factors such as antenna configuration, antenna type, operating frequencies, known oil/water/gas/solids flow distribution, etc. In some examples, the forward modeler 206 uses a second forward model (e.g., a dielectric mixing model) to determine flow mixture permittivity and mixture conductivity ($\varepsilon$, $\sigma$) based on liquid holdup, water-in-liquid (WLR), water conductivity, and oil/water/gas ($\varepsilon$, $\sigma$) distribution. Permittivity of oil or gas is typically known from sample chemical-composition analysis (e.g. obtained from gas chromatography) and from the measured line-condition pressure and temperature.

Based on the signal data 201 measured by the transmitter-receiver pairs $T_x$-$R_x$ and the forward model(s) generated by the forward modeler 206, the example inverse modeler 208 of FIG. 2 performs inversion(s) of the model(s) to determine fluid flow properties such as flow mixture permittivity, flow mixture conductivity, liquid holdup, water conductivity, etc. For example, the inverse modeler 208 performs an inversion of the first forward model to determine the flow mixture permittivity and/or conductivity ($\varepsilon$, $\sigma$) based on the measured (AT, PS) data (i.e., the (AT, PS) data calculated by the AT/PS calculator 204 from the signal data 201). In some examples, the example inverse modeler 208 performs an inversion of the second forward model (e.g., an inverse dielectric mixing model) to determine values such as liquid holdup, water-in-liquid ratio (WLR), and water conductivity (salinity) based on the permittivity and/or conductivity ($\varepsilon$, $\sigma$) values or distribution determined from the inversion of the first forward model. In the example of FIG. 2, data generated by the forward modeler 206 and/or the inverse modeler 208 can be stored in the example database 202. Similarly, the forward modeler 206 and/or the inverse modeler 208 can access stored data from the database 202.

The forward modeler 206 and the example inverse modeler 208 of FIG. 2 communicate to perform an optimization process. The optimization process includes minimizing a difference between the forward-model predicted (AT, PS) data and the (AT, PS) data measured from the signal data 201 (e.g. the (AT, PS) data calculated from the AT/PS calculator 204). As a result of the optimization, a converged flow mixture permittivity and conductivity ($\varepsilon$, $\sigma$) values or distribution are determined. The converged flow mixture permittivity and conductivity ($\varepsilon$, $\sigma$) distribution can be used by the inverse modeler 208 to calculate variables such as spatial-averaged liquid holdup and water-in-liquid ratio (WLR), as discussed herein based on inverse dielectric mixing model.

The converged flow mixture permittivity and conductivity ($\varepsilon$, $\sigma$) distribution determined over a time period can be used to identify a flow regime for the fluid in the flow pipe 102 of FIG. 1, such as a substantially stratified flow, a slug flow, etc. In some examples, the forward modeler 206 and/or the inverse modeler 208 adjust the ($\varepsilon$, $\sigma$) distribution models based on the flow regime. In some examples, levels of imbalance in the AT and/or PS measurements by the transmitter-receiver pairs $T_x$-$R_x$ of the same spacing(s) may additionally or alternatively be used to differentiate stratified and transient/intermittent flow regimes, such as slug flows.

The WLR and the liquid holdup $\alpha_{liquid}$ determined by the inverse modeler 208 can be used to calculate the flow mixture density $\rho_m$ as below:

$$\rho_m = \rho_{liquid}\alpha_{liquid} + \rho_{gas}(1-\alpha_{liquid}) \quad (5)$$

$$\rho_{liquid} = WLR\rho_{water} + (1-WLR)\rho_{oil} \quad (6)$$

where $\rho_{liquid}$, $\rho_{water}$, $\rho_{oil}$ and $\rho_{gas}$ are liquid density, water density, oil density and gas density, respectively. Water density, oil density and gas density are known from fluids property pressure-volume-temperature (PVT) model(s), given the fluids pressure measured by the pressure sensor 132 and the temperature measured by the temperature sensor 134.

The example flow mixture analyzer 128 of FIG. 2 includes a flow velocity calculator 210. The example flow velocity calculator 210 of FIG. 2 determines flow velocities of one or more portions of the multiphase fluid based on cross-correlations of signals of the axially-spaced $T_x$-$R_x$ antenna pairs. For a single-phase or substantially uniform fluid, differential pressure measurements collected by the differential pressure sensor 130 across the modular venturi 136 can be used to determine flow velocity and flow rate. For multiphase fluids, the flow velocity calculator 210 uses time delays between signals received at axially spaced upstream and downstream receivers to determine flow velocities and flow rates of the moving multiphase fluid. The use of the modular venturi 136 may provide complementary measurement of multiphase-fluid total flow rate.

For example, the flow velocity calculator 210 uses cross-correlations between signals of the near-spaced antenna pairs $T_u$-$R_{u1}$, $T_d$-$R_{d1}$ and the medium-spaced antenna pairs $T_u$-$R_{u2}$, $T_d$-$R_{d2}$ to determine liquid (e.g., oil, water) flow velocities (e.g., for the portion of the fluid 103 proximate to the area of the wall 106 of the flow pipe 102 to which the transmitting and receiving antennas are coupled). As another example, the flow velocity calculator 210 uses cross-correlations between signals of the far-spaced antenna pairs, $T_u$-$R_{u3}$, $T_d$-$R_{d3}$, and the very far-spaced antenna pairs $T_u$-$R_{u4}$, $T_d$-$R_{d4}$ to determine flow velocity derived from gas and/or liquid slug velocity.

As discussed above, the axial spacings $d_1$, $d_2$, $d_3$, $d_4$ of the upstream and downstream $T_x$-$R_x$ pairs are known (e.g., Equations 1-4, above). The example flow velocity calculator 210 determines a transit time $\tau_i(\Delta T)$ over a rolling short-duration $\Delta T$ (e.g. 1 second, 5 seconds), which corresponds to the peak value of a cross-correlation function $R_{ud,i}(\tau)$ between instantaneous signals $S_{Tu-Rui}(t)$ and $S_{Td-Rdi}(t)$ measured by the $T_x$-$R_x$ pairs over $\Delta T$, $T_u$-$R_{u1}$ and $T_d$-$R_{di}$. In the example of FIG. 2, the transit time $\tau_i(\Delta T)$ represents a time delay between signals received at corresponding upstream and downstream receivers $R_{ui}$, $R_{di}$, as the fluid flows from upstream to downstream. The transit time $\tau_i(\Delta T)$ can be expressed as:

$$\tau_i(\Delta T) \xleftarrow{maximum} R_{ud,i}(\tau) = \frac{1}{\Delta T}\int_0^{\Delta T} S_{Tu-Rui}(t) S_{Td-Rdi}(t-\tau)dt, \quad (7)$$

where measured signals (S) may be the AT data, the PS data, or the raw electrical signals representative of AT or PS, or the derived $\varepsilon$ or $\sigma$ parameters. Based on the transit time $\tau_i(\Delta T)$, the flow velocity calculator 210 of FIG. 2 calculates a rolling short-duration cross correlation flow velocity $U_i(\Delta T)$ as follows:

$$U_i(\Delta T) = \frac{d_i}{\tau_i(\Delta T)}. \quad (8)$$

As disclosed above, the cross-correlation velocities $U_i(\Delta T)$, where i=1, 2, 3, 4 can be used to determine liquid (water, oil) and gas (e.g., slug) flow velocities. For example, flow velocities $U_1(\Delta T)$ and $U_2(\Delta T)$ determined based on signal data from the near-spaced antenna-pairs $T_u$-$R_{u1}$, $T_d$-$R_{d1}$ and the medium-spaced antenna pairs $T_u$-$R_{u2}$, $T_d$-$R_{d2}$ can be used to determine liquid (oil, water) flow velocities. The flow velocities $U_3(\Delta T)$ and $U_4(\Delta T)$ determined based on signal data from the far-spaced antenna-pairs $T_u$-$R_{u3}$, $T_d$-$R_{d3}$ and the very far-spaced antenna-pairs $T_u$-$R_{u4}$, $T_d$-$R_{d4}$ can be used to determine the velocity of gas slugs or gas-liquid wavy interfaces. In some examples, the flow velocity calculator 210 determines mean gas and liquid flow velocities using flow modelling (e.g., based on the principle of fluid mechanics).

In some examples, the flow velocity calculator 210 of FIG. 2 determines oil and water flow rates based on the liquid holdup and the WLR (e.g., as determined by the inverse modeler 208) and the liquid flow velocities. In some examples, the flow velocity calculator 210 determines slug-flow gas flow rates based on the liquid holdup and the gas slug (or gas-liquid wavy interface) velocity using a slug (or wavy-stratified) flow model.

As disclosed above, in some examples the system 100 of FIG. 1 includes the modular venturi 136. The flow velocity calculator 210 can measure a total volumetric flow rate $Q_v$ for the multiphase fluid 103 based on the venturi differential pressure $\Delta P_v$, based on the following equation:

$$Q_v \approx \frac{A_v C_d}{\sqrt{1-\beta^4}} \sqrt{\frac{2\Delta P_v}{\rho_m}}. \quad (9)$$

In Equation (9) above, the term $C_d$ represents the Venturi discharge coefficient that is a function of the Reynolds number Re of the flow mixture (Re is in turn a function of the mixture density $\rho_m$, mixture velocity $U_m$, liquid mixture viscosity, and the inner diameter $d_v$ of the venturi throat section; with the area being $$A_v = \frac{\pi}{4}d_v^2).$$

The term $\beta$ in Equation (9) represents the venturi beta ratio $\beta=d_v/D$. The mixture density $\rho_m$ is related to the WLR and the liquid holdup $\alpha_{liquid}$ as described in Equation (5); an appropriate flow-model can be used to relate the mixture density measured at the flow pipe 102 to the mixture density at the throat section of the modular venturi 136.

In some examples, the flow velocity calculator 210 calculates flow mixture density from the liquid holdup and the WLR (from Equation (5)) as part of determining the total flow rate $Q_v$ measurement (from Equation (9)). In some examples, the flow velocity calculator 210 can determine a gas flow rate based on the total flow rate and the liquid flow rate (calculated as $Q_{liquid}=U_{Liquid}\alpha_{Liquid} A$, with A being the cross sectional area the flow pipe 102).

In other examples, the example system 100 of FIG. 1 can include ultrasonic transit-time transducers disposed at a surface of the flow pipe 102 substantially opposite the underside surface of wall 106 of the flow pipe 102 of FIG. 1. The transducers can measure gas flow velocity of the stratified gas-liquid flow directly and transmit the data to the flow mixture analyzer 128. In such examples, the flow velocity calculator 210 of FIG. 2 can determine the gas flow rate from the gas flow velocity and gas holdup ($\alpha_{gas}$) (where the gas holdup can be determined from the liquid holdup, e.g., 1−liquid holdup).

The example flow mixture analyzer 128 of FIG. 2 includes a communicator 212. The example communicator 212 transmits the values determined via the optimization performed by the forward modeler 206 and the inverse modeler 208 such as flow mixture permittivity and conductivity, water conductivity, water salinity, liquid holdup, and WLR to, for example, one or more other processors, one or more display devices, etc. The example communicator 212 transmits the flow velocities, flow rates, etc. determined by the flow velocity calculator 210 to other processor(s), display device(s), etc. The example communicator 212 of FIG. 2 can transmit the data via one or more wired or wireless connections in response to, for example, user inputs and/or settings.

Figure 3:
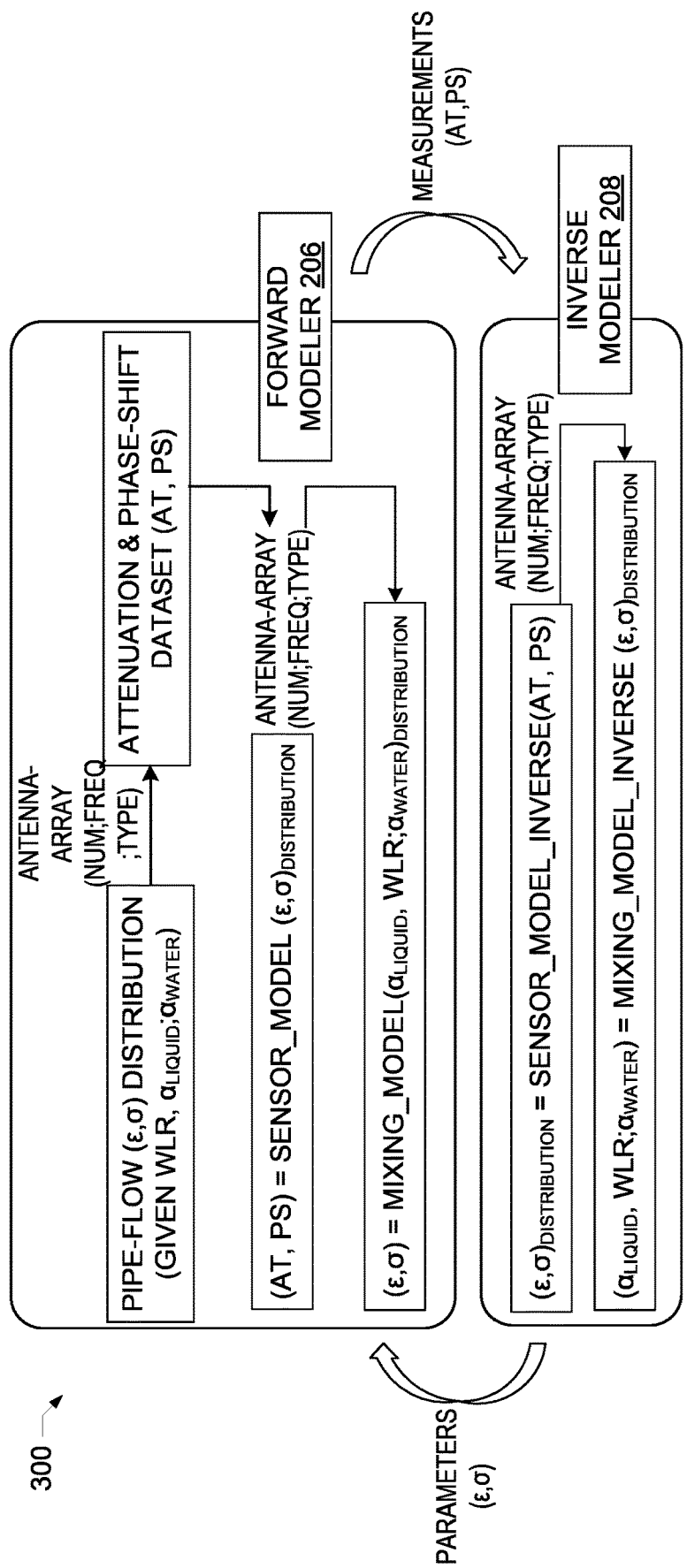
FIG. 3 depicts an example flow modelling process that may be implemented by the example flow mixture analyzer of FIG. 2.

FIG. 3 depicts an example flow modelling process (e.g., optimization process) 300 that can be performed by the forward modeler 206 and the inverse modeler 208 of the flow mixture analyzer 128 of FIG. 2. In the example of FIG. 3, the forward modeler 206 generates one or more forward models based on known fluid flow data. The forward modeler 206 uses the forward model(s) to predict (AT, PS) measurements as a function of:

(1) antenna pipe configuration (e.g., a linear array of the transmitters and receivers as illustrated in FIG. 1 or another configuration such as a circular array, a hybrid circular-linear array, of transmitter and receivers disposed around a portion of a pipe with a known pipe inner diameter);
(2) antenna type (e.g., magnetic dipole, electric dipole, cross magnetic dipoles);
(3) number of transmitting and receiving antennas (and, thus, a number of transmitter-receiver pairs);
(4) positioning of the receiving antennas relative to the transmitting antennas (e.g., a distance $r_1$ of the respective receivers $R_x$ relative to one of the transmitters $T_x$ as illustrated in FIG. 1);
(5) operating frequencies (e.g., RF frequencies for different measurement sensitivity ranges, pipe sizes, brine conductivity ranges);
(6) given oil/water/gas/solids flow component distribution; and
(7) known liquid holdup ($\alpha_{liquid}$), water-in-liquid ratio (WLR), and water conductivity ($\sigma_{water}$) values.

The forward modeler 206 generates a first forward model, or a sensor model based on, for instance, known data obtained from 3-dimensional electromagnetic field analytic and/or numerical modeling and/or experimental and/or empirical correlations. In some examples, the forward modeler 206 simulates flow based on, for example, known flow mixture permittivity and conductivity ($\varepsilon$, $\sigma$) at given liquid holdup ($\alpha_{liquid}$), water-in-liquid ratio (WLR), and water conductivity ($\sigma_{water}$) values for particular antenna array configurations and operating frequencies to predict the (AT, PS) data using the sensor model. Oil permittivity ($\varepsilon_{oil}$) and gas permittivity ($\varepsilon_{gas}$) are known from the fluids property data, given the measured temperature and pressure. Water permittivity ($\varepsilon_{water}$) can be determined from the water conductivity ($\sigma_{water}$) value or water salinity value, given the measured temperature and pressure.

As shown in FIG. 3, the forward modeler 206 generates a second forward model, or a dielectric mixing model. The mixing model can be used to determine flow mixture permittivity and conductivity ($\varepsilon$, $\sigma$) as a function of known liquid holdup ($\alpha_{liquid}$), WLR, oil permittivity ($\varepsilon_{oil}$), gas permittivity ($\varepsilon_{gas}$), water permittivity ($\varepsilon_{water}$) and water conductivity ($\sigma_{water}$).

As represented in FIG. 3, the measured (AT, PS) data (e.g., the (AT, PS) data calculated by the AT/PS calculator 204 of FIG. 2 based on the transmitter-receiver pair signal data 201) is provided to the inverse modeler 208. The inverse modeler 208 performs an inversion of the sensor model using the measured (AT, PS) data to calculate the flow mixture permittivity and/or conductivity ($\varepsilon$, $\sigma$) distribution (e.g., a stratified gas/oil/water parametric model with varying thickness of each fluid layer) for the fluid flowing through the pipe (e.g., the fluid 103 of FIG. 1). In some examples, the flow mixture permittivity and conductivity ($\varepsilon$, $\sigma$) distribution can be interpreted or visualized using tomographic image reconstruction to, for example, visualize flow distributions of the fluid.

As also shown in FIG. 3, the inverse modeler 208 calculates liquid holdup (liquid), WLR, and water conductivity ($\sigma_{water}$) for the fluid flowing in the pipe by performing an inversion of the dielectric mixing model using the flow mixture permittivity and conductivity ($\varepsilon$, $\sigma$) distribution found via the inversion of the sensor model. Other inversion methods may be used, such as, for example, interpolation using pre-calculated look-up table or by using deep learning neural networks.

As represented in FIG. 3, the flow mixture permittivity and conductivity ($\varepsilon$, $\sigma$) parameters determined by the inverse modeler 208 are provided to the forward modeler 206 as part of the optimization process to train, revise, or tune the model(s) generated by the forward modeler 206 to minimize differences between the forward-model predicted (AT, PS) data and the (AT, PS) data measured from the signal data. The example optimization process 300 can be used to obtain converged flow mixture permittivity and conductivity ($\varepsilon$, $\sigma$) distributions (e.g., parametric models) that can be used to identify flow regimes and determine parameters such as liquid holdup, WLR, and water conductivity (salinity).

Figure 4:
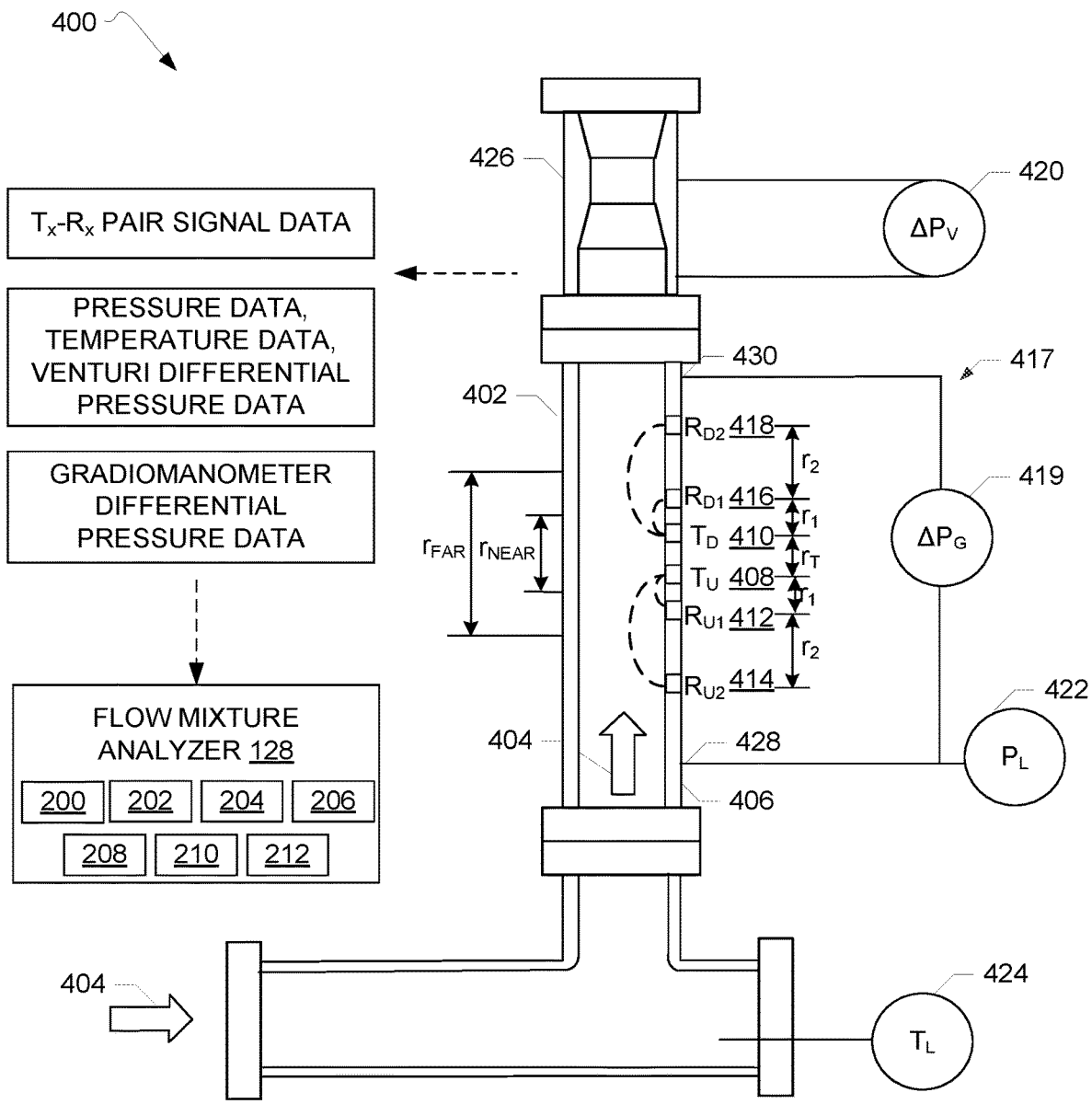
FIG. 4 illustrates another example system for analyzing fluid flows constructed in accordance with teachings disclosed herein.

Although the example flow mixture analyzer 128 of FIGS. 1 and 2 and the example optimization process 300 of FIG. 3 is discussed in connection with the horizontally disposed flow pipe 102 of FIG. 1, examples disclosed herein can also be implemented with a substantially vertically oriented flow pipe. FIG. 4 illustrates an example system 400 including a fluid conduit (e.g., flow pipe) 402 disposed in a vertical configuration. A fluid flows through the vertically oriented flow pipe 402 in a direction of arrows 404 of FIG. 4. The fluid may be a multiphase fluid. When the fluid flows through the vertically oriented flow pipe 402, the flow is non-stratified as compared to flow of the fluid through a horizontally oriented pipe, such as the flow pipe 102 of FIG. 1. For example, gas may flow through a center portion of the vertically oriented flow pipe 402 and liquid may flow around the gas proximate to the pipe walls.

The example system 400 of FIG. 4 includes a plurality of radio frequency (RF)/microwave transmitting antennas and receiving antennas coupled to a wall 406 of the flow pipe 402 in a substantially linear array (e.g., disposed along a longitudinal axis of the flow pipe 402). For example, the system 400 includes a first electromagnetic transmitter 408 ($T_u$) and a second electromagnetic transmitter 410 ($T_d$). The receiving antennas coupled to the flow pipe 402 include a first electromagnetic receiver 412 ($R_{u1}$), a second electromagnetic receiver 414 ($R_{u2}$), a third electromagnetic receiver 416 ($R_{d1}$), and a fourth electromagnetic receiver 418 ($R_{d2}$). The example system 400 can include transmitting and/or receiving antennas in addition to those illustrated in FIG. 4. For ease of discussion, the first and second electromagnetic transmitters 408, 410 will be referred to herein as $T_u$, $T_d$, respectively, and the first through fourth electromagnetic receivers 412, 414, 416, 418 will be referred to as $R_{u1}$, $R_{u2}$, $R_{d3}$, $R_{d4}$, respectively.

As shown in FIG. 4, the first electromagnetic transmitter $T_u$ and the first and second electromagnetic receivers Rut, $R_{u2}$ are disposed proximate to upstream flow of the fluid through the flow pipe 402. The first and second electromagnetic receivers $R_{u1}$, $R_{u2}$ receive (e.g. simultaneously) the signals transmitted by the first electromagnetic transmitter $T_u$ at one or more RF and/or microwave frequencies and, thus, form antennas pairs with the first transmitter $T_u$ substantially as disclosed in connection with FIG. 1. As show in FIG. 4, the first electromagnetic receiver Ru is disposed near to the first electromagnetic transmitter $T_u$ (e.g., a distance $r_1$ from the first transmitter $T_u$) and the second electromagnetic receiver $R_{u2}$ is disposed farther from the first electromagnetic transmitter $T_u$ (e.g., a distance $r_1 + r_2$ from the first transmitter $T_u$). In some examples, any of the first through fourth electromagnetic receivers $R_{u1}$, $R_{u2}$, $R_{d3}$, $R_{d4}$ can receive (e.g. simultaneously) the signals transmitted by the first electromagnetic transmitter $T_u$.

As shown in FIG. 4, the second electromagnetic transmitter $T_d$ and the third and fourth electromagnetic receivers $R_{d1}$, $R_{d2}$ are disposed proximate to downstream flow of the fluid through the flow pipe 402. The third and fourth electromagnetic receivers $R_{d1}$, $R_{d2}$ receive (e.g. simultaneously) the signals transmitted by the second electromagnetic transmitter $T_d$ at one or more RF and/or microwave frequencies and, thus, form antennas pairs with the second transmitter $T_d$ substantially as disclosed in connection with FIG. 1. As show in FIG. 4, the third electromagnetic receiver $R_{d1}$ is disposed near to the second electromagnetic transmitter $T_d$ (e.g., a distance $r_1$ from the second transmitter $T_d$) and the fourth electromagnetic receiver $R_{d2}$ is disposed farther from the second electromagnetic transmitter $T_d$ (e.g., a distance $r_1+r_2$ from the second transmitter $T_d$). In some examples, any of the first through fourth electromagnetic receivers $R_{u1}$, $R_{u2}$, $R_{d1}$, $R_{d2}$ can receive (e.g. simultaneously) the signals transmitted by the second electromagnetic transmitter Ta.

The transmitter-receiver pairs $T_x$-$R_x$ of FIG. 4 generate signal data that can be used to generate AT and PS data at one or more RF frequencies substantially as disclosed in connection with the example of FIG. 1. In the example of FIG. 4, the signal data generated by the transmitter-receiver pairs $T_x$-$R_x$ is transmitted to the example flow mixture analyzer 128. Based on the signal data, the AT/PS calculator generates compensated differential (AT, PS) measurements that are substantially immune from the effects of gain drift, as disclosed above. At least two transmitters and two receivers, with two substantially different transmitter-receiver spacings, are required to calculate one set of compensated differential (AT, PS) data by the AT/PS calculator 204.

As an example, referring to FIG. 4, the transmitter-receiver pair $T_u$-$R_{u1}$ is disposed at a first spacing $r_1$ and the transmitter-receiver pair $T_u$-$R_{d1}$ is at a second spacing $r_T+r_1$. Also, the transmitter-receiver pair $T_d$-$R_{d1}$ is at the first spacing $r_1$ and the transmitter-receiver pair $T_d$-$R_{u1}$ is at the second spacing $r_T+r_1$. Thus, the AT/PS calculator 204 can determine a set of compensated differential (AT, PS) data based on the $T_u$-$R_{u1}$, $T_u$-$R_{d1}$, $T_d$-$R_{d1}$, $T_d$-$R_{u1}$ transmitter-receiver pairs. As another example, the transmitter-receiver pair $T_u$-$R_{u2}$ is disposed at a first spacing $r_1+r_2$ and the transmitter-receiver pair $T_u$-$R_{d2}$ is at a second spacing $r_T+r_1+r_2$. Also, the transmitter-receiver pair $T_d$-$R_{d2}$ is at the first spacing $r_1+r_2$ and the transmitter-receiver pair $T_d$-$R_{u2}$ is at the second spacing $r_T+r_1+r_2$. Thus, the AT/PS calculator 204 can determine a set of compensated differential (AT, PS) data based on the $T_u$-$R_{u2}$, $T_u$-$R_{d2}$, $T_d$-$R_{d2}$, $T_d$-$R_{u2}$ transmitter-receiver pairs. The flow mixture analyzer 128 determines the flow mixture permittivity and/or conductivity ($\varepsilon$, $\sigma$) based on the (AT, PS) data determined from the signal data substantially as disclosed in connection with FIGS. 2 and 3 (e.g., using the forward model(s) generated by the forward modeler 206 and inversion(s) performed by the inverse modeler 208). The inverse modeler 208 of the flow mixture analyzer 128 can determine the liquid holdup, WLR, and brine water conductivity (salinity) using inversions and modelling based on the (AT, PS) data and the permittivity and conductivity ($\varepsilon$, $\sigma$) as discussed above in connection with FIGS. 2 and 3. In some examples, the forward model(s) implemented by the forward modeler 206 and/or the inversion(s) performed by the inverse modeler 208 are adjusted to account for the vertical flow of the fluid through the flow pipe 402 (e.g., as compared to the horizontal flow of the fluid through the flow pipe 102 of FIG. 1). For example, adjustments may be made to the forward model(s) to account for the varying amount of gas-rich fluid flowing through the center region of the vertical fluid stream as part of an optimization process to minimize differences between the measurements predicted by the forward modeler 206 using the forward model(s) and the measurements obtained based on the signal data collected by the antennas. Also, in the example of FIG. 4, the flow velocity calculator 210 of the flow mixture analyzer 128 performs cross-correlation analyses of the signals of the axially spaced near $T_x$-$R_x$ pairs (e.g., $T_u$-$R_{u1}$, $T_d$-$R_{d1}$) and far $T_x$-$R_x$ pairs (e.g., $T_u$-$R_{u2}$, $T_d$-$R_{d2}$) to calculate flow velocities and flow rate, as disclosed herein.

The example system 400 of FIG. 4 includes a gradiomanometer 417 with a first pressure port 428 and a second pressure port 430 coupled to the upstream and downstream locations of the flow pipe 402. The gradiomanometer 417 has a differential pressure sensor 419 that measures a differential pressure $\Delta P_G$ across the pressure ports 428 and 430 with an axial distance or spacing $h_G$. The gradiomanometer differential pressure data $\Delta P_G$ can be used by the flow mixture analyzer 128 to provide an alternative determination of the liquid holdup ($\alpha_{liquid}$) using WLR and flow velocities determined by electromagnetic transmitter-receiver pairs $T_x$-$R_x$.

The differential pressure $\Delta P_G$ measured by the gradiomanometer consists of two contributions: the hydrostatic contribution ($\rho_m$ g $h_G$) from the flow mixture, and the frictional contribution $P_f$ between the (liquid) continuous phase and the pipe wall, viz.

$$\Delta P_G = \rho_m g h_G + P_f \qquad (10),$$

where g is the gravitational constant (=9.81 m/s$^2$); $\rho_m$ is the mixture density which is a function of liquid holdup $\alpha_{liquid}$ and the WLR as described by Equations (5)-(6).

In order to derive the mixture density from the hydrostatic contribution, the measured $\Delta P_G$ is corrected for flow friction, viz.

$$\rho_m = (\Delta P_G - P_f)/(g\, h_G) \qquad (11).$$

The liquid holdup $\alpha_{liquid}$ can be alternatively calculated from the mixture density $\rho_m$ in Equation (11) from Equations (5)-(6), viz.

$$\alpha_{liquid} = (\rho_m - \rho_{gas})/(\rho_{liquid} - \rho_{gas}) \qquad (12).$$

The frictional pressure $P_f$ in Equation (11) that needs to be corrected can be modelled, for example, as follows:

$$P_f = 2f\alpha_{liquid}\rho_{liquid}U_{liquid}^2 h_G/D \qquad (13),$$

where D is the inner diameter of the flow pipe 402. The liquid velocity $U_{liquid}$ may be determined by the flow velocity calculator 210 of the flow mixture analyzer 128 by performing cross-correlation analyses of the signals of the axially spaced near $T_x$-$R_x$ pairs (e.g., $T_u$-$R_{u1}$, $T_d$-$R_{d1}$ of FIG. 4) as disclosed herein.

In Equation (13), the frictional factor f can be calculated by using an empirical model, such as below:

$$f = aRe^{-b} \qquad (14),$$

where a and b are model constants; Reynolds number Re of the liquid mixture is:

$$Re = \rho_{liquid}U_{liquid}D/U_{liquid}, \qquad (15),$$

where $U_{liquid}$ is the liquid mixture viscosity calculated by the flow mixture analyzer 128 by using an appropriate model, given the WLR and the viscosities of oil and water at the measured pressure and temperature. Equation (6) can be used to calculate the liquid mixture density $\rho_{liquid}$.

In some examples, the system 400 of FIG. 4 includes a modular venturi 426 coupled to the flow pipe 402 downstream of the gradiomanometer 417. A differential pressure $\Delta P_V$ can be measured by a differential pressure sensor 420 mounted across the modular venturi 426. The flow velocity calculator 210 of FIG. 2 can use the venturi differential pressure $\Delta P_V$ to determine a total volumetric flow rate $Q_v$ at near single-phase or substantially well-mixed (e.g., bubbly, mist) flow conditions, given the mixture density estimated, for example, by the gradiomanometer $\Delta P_G$ (Equation (11)). In some examples, the venturi differential pressure $\Delta P_V$ complements the flow rate measurements determined based on the cross-correlation analysis of the signal data. In the example of FIG. 4, the flow velocity calculator 210 of the flow mixture analyzer 128 performs cross-correlation analyses of the signals of the axially spaced near $T_x$-$R_x$ pairs to derive liquid velocity $U_{liquid}$, then to perform iterative calculations of frictional pressure and mixture density (based on Equations (11)-(15)).

In some examples, the system 400 of FIG. 4 can include pressure sensor 422 and temperature sensor 424 to measure line pressure ($P_L$) and line temperature ($T_L$), respectively. The line pressure and line temperature can be provided as inputs to the flow velocity calculator 210 to convert the flow rate values from line conditions to standard conditions.

Figure 5:
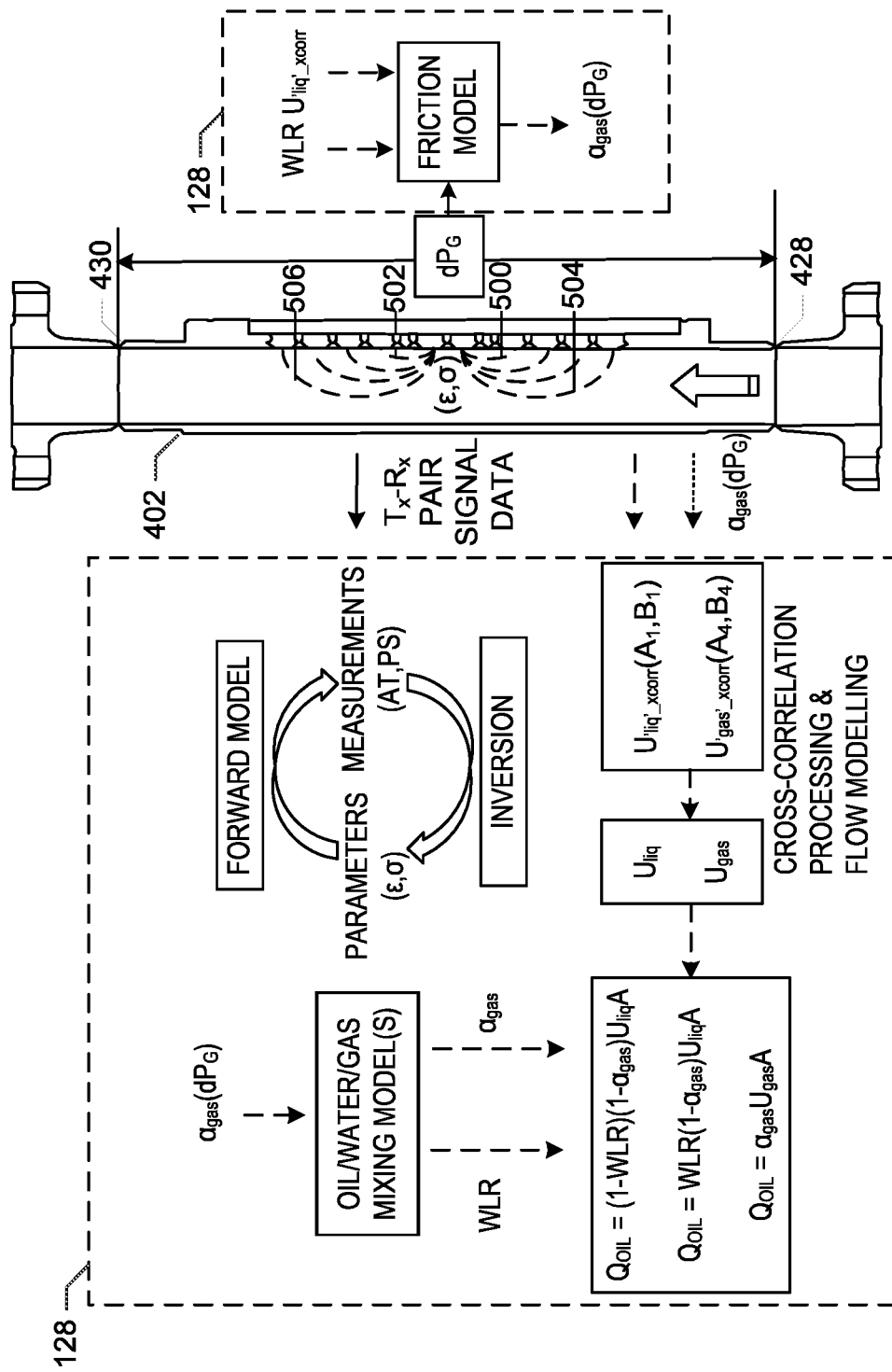
FIG. 5 depicts another example flow modelling process that may be implemented by the example flow mixture analyzer of FIG. 2.

FIG. 5 depicts an example flow modelling process that may be implemented in connection with the vertically disposed flow pipe 402 of FIG. 4. In particular, the diagram of FIG. 5 illustrates the relationships between (a) the (AT, PS) data generated from the $T_x$-$R_x$ pairs signal data and the flow mixture permittivity and conductivity ($\varepsilon$, $\sigma$) parameters determined using the forward model/inversion process and (b) the cross-correlation flow-velocity processing and flow modeling based on the gas holdup ($\alpha_{gas}=1-\alpha_{liquid}$) derived from the gradiomanometer differential pressure $\Delta P_G$, which can be used to determine oil, water, and gas volumetric flow rates. The processes shown in the example of FIG. 5 can be implemented by the example flow mixture analyzer 128 of FIG. 5 (e.g., the AT/PS calculator 204, the forward modeler 206, the inverse modeler 208, and/or the flow velocity calculator 210).

As shown in FIG. 5, signal data generated by the $T_x$-$R_x$ antenna pairs of FIG. 4 is processed using forward model(s) and inversion(s) to obtain (AT, PS) measurements and flow mixture permittivity and/or conductivity ($\varepsilon$, $\sigma$) parameters for the fluid flowing through the flow pipe 402. The flow mixture permittivity and conductivity ($\varepsilon$, $\sigma$) data can be further processed using dielectric mixing model(s) to determine, for example, WLR and gas holdup ($\alpha_{gas}=1-$(liquid). Alternatively, gas holdup can be determined from the differential pressure $dP_G$ measured by gradiomanometer 417 across the pressure ports 428 and 430 coupled to the flow pipe 402.

In the example of FIG. 5, cross-correlation processing of, for instance, respective signals 500, 502 transmitted between the axially near spaced $T_x$-$R_x$ antenna pairs (e.g., $T_{u1}$-$R_{u1}$, $T_{d1}$-$T_{d1}$ illustrated in FIG. 4, with spacing $r_{near}$) can be used by the flow velocity calculator 210 of FIG. 3 to determine near-wall liquid velocity ($U_{liq\_xcorr}$) (e.g., for the liquid portion of the fluid flowing proximate to the pipe wall). Cross-correlation processing of, for instance, respective signals 504, 506 transmitted between the axially far spaced $T_x$-$R_x$ antenna pairs (e.g., $T_u$-$R_{u2}$, $T_d$-$T_{d2}$ illustrated in FIG. 4, with spacing $r_{far}$) can be used by the flow velocity calculator 210 to determine gas (slug) velocity $U_{gas\_xcorr}$ (e.g., for the gas portion of the fluid flowing through the center of the flow pipe 402). The flow velocity calculator 210 can use the cross-correlation flow velocities $U_{liq\_xcorr}$, $U_{gas\_xcorr}$ to determine liquid phase velocity $U_{liq}$ and gas phase velocity $U_{gas}$ via, for example, flow modeling.

As mentioned above, gas holdup ($\alpha_{gas}$) can be obtained based on the liquid holdup determined based on the flow mixture permittivity and conductivity ($\varepsilon$, $\sigma$) (e.g., $\alpha_{gas}=1-\alpha_{liquid}$). In the example of FIG. 5, differential pressure $dP_G$ measured by the gradiomanometer 417 is used by, for instance, the flow velocity calculator 210 as part of an alternative method for determining gas holdup. As shown in FIG. 5, the gradiomanometer differential pressure $dP_G$, the WLR, and the near-wall liquid velocity ($U_{liq\_xcorr}$) values are provided as inputs to a friction-pressure correction model to determine gas holdup as a function of the gradiomanometer differential pressure ($\alpha_{gas}(dP_G)$). The gas holdup ($\alpha_{gas}(dP_G)$) can be used as a complementary input by the inverse modeler 208 in determining the WLR and the gas holdup ($\alpha_{gas}$) based on the mixture permittivity and conductivity ($\varepsilon$, $\sigma$) determined from the transmitter-receiver antenna pair signal data.

In the example of FIG. 5, the flow velocity calculator 210 can determine oil, water, and gas volumetric flow rates $Q_{oil}$, $Q_{water}$, and $Q_{gas}$ from the WLR and gas holdup ($\alpha_{gas}$) values determined from the signal data generated by $T_x$-$R_x$ antenna pairs and the liquid phase velocity $U_{liq}$ and the gas phase velocity $U_{gas}$ derived from the flow modeling of the cross-correlation flow velocities $U_{liq\_xcorr}$, $U_{gas\_xcorr}$. Thus, the example flow mixture analyzer 128 of FIGS. 1-5 can be used to determine properties of a multiphase fluid flowing in a horizontally disposed pipe or a vertically disposed pipe based on signal data generated by transmitting and receiving antenna pairs arranged in a substantially linear array.

While an example manner of implementing the flow mixture analyzer of FIGS. 1-5 is illustrated in FIGS. 2 and 4, one or more of the elements, processes and/or devices illustrated in FIGS. 2 and 4 may be combined, divided, re-arranged, omitted, eliminated and/or implemented in any other way. Further, the example signal transmission manager 200, the example database 202, the example AT/PS calculator 204, the example forward modeler 206, the example inverse modeler 208, the example flow velocity calculator 210, the example communicator 212 and/or, more generally, the example flow mixture analyzer of FIGS. 1-5 may be implemented by hardware, software, firmware and/or any combination of hardware, software and/or firmware. Thus, for example, any of the example signal transmission manager 200, the example database 202, the example AT/PS calculator 204, the example forward modeler 206, the example inverse modeler 208, the example flow velocity calculator 210, the example communicator 212 and/or, more generally, the example flow mixture analyzer of FIGS. 1-5 could be implemented by one or more analog or digital circuit(s), logic circuits, programmable processor(s), programmable controller(s), graphics processing unit(s) (GPU (s)), digital signal processor(s) (DSP(s)), application specific integrated circuit(s) (ASIC(s)), programmable logic device (s) (PLD(s)) and/or field programmable logic device(s) (FPLD(s)). When reading any of the apparatus or system claims of this patent to cover a purely software and/or firmware implementation, at least one of the example signal transmission manager 200, the example database 202, the example AT/PS calculator 204, the example forward modeler 206, the example inverse modeler 208, the example flow velocity calculator 210, and/or the example communicator 212 is/are hereby expressly defined to include a non-transitory computer readable storage device or storage disk such as a memory, a digital versatile disk (DVD), a compact disk (CD), a Blu-ray disk, etc. including the software and/or firmware. Further still, the example flow mixture analyzer of FIGS. 1-5 may include one or more elements, processes and/or devices in addition to, or instead of, those illustrated in FIGS. 2 and 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
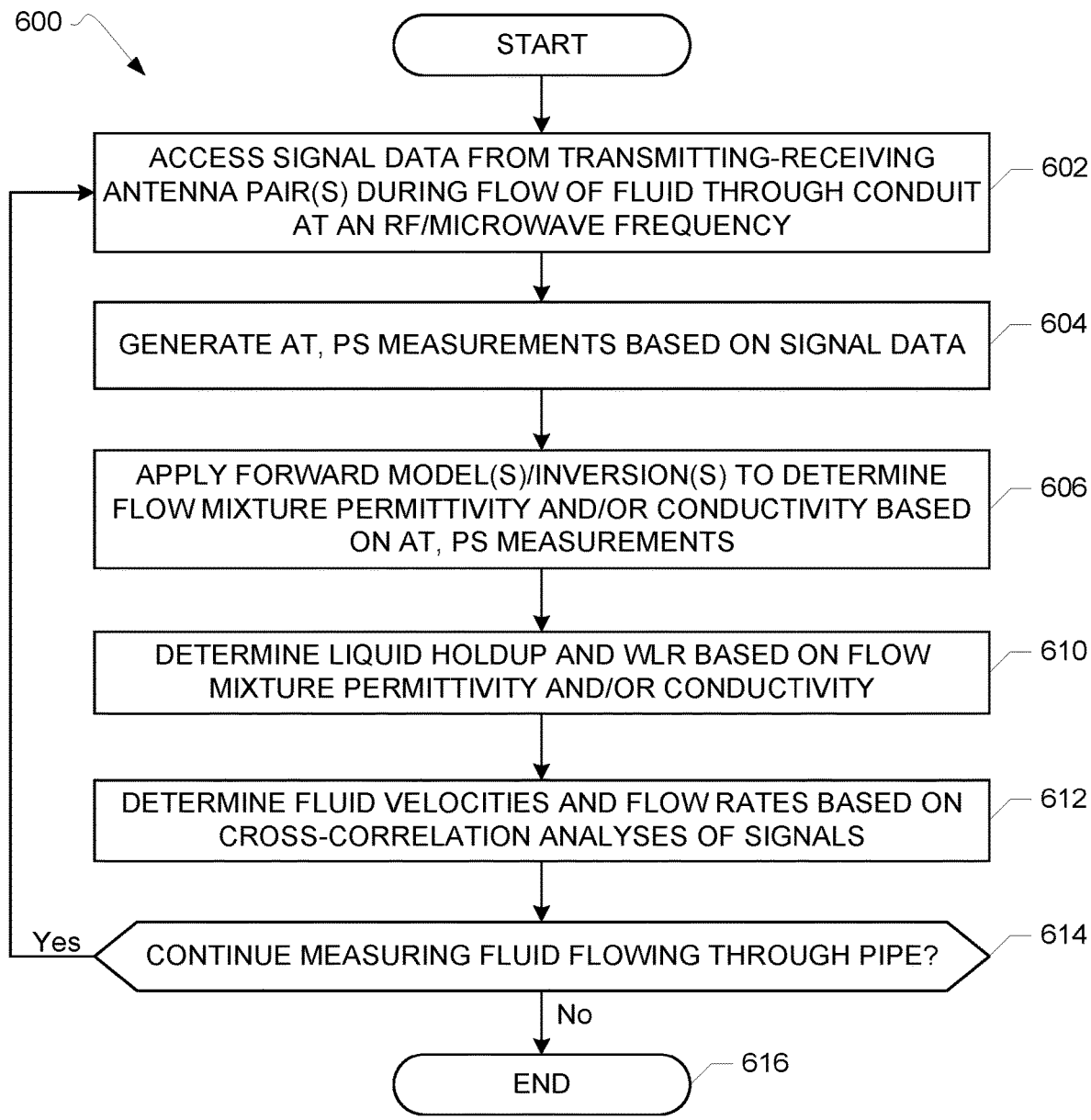
FIG. 6 is a flowchart of an example method that may be executed to implement the example flow mixture analyzer of FIG. 2.

A flowchart representative of example machine readable instructions that may be used to implement the example flow mixture analyzer 128 of FIGS. 1-5 is shown in FIG. 6. The machine readable instructions may be a program or portion of a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example flow mixture analyzer 128 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 6 is a flowchart of an example method 600 to analyze a multiphase fluid flowing through a pipe, such as the horizontally disposed flow pipe 102 of FIG. 1 or the vertically disposed flow pipe 402 of FIG. 4. The example method 600 of FIG. 6 can be implemented by the example flow mixture analyzer 128 of FIGS. 1-5.

The example method 600 of FIG. 6 includes accessing signal data generated by transmitting and receiving antenna pair(s) at an RF/microwave frequency during flow of a fluid through a fluid conduit (block 602). For example, based on instructions from the signal transmission manager 200 of FIG. 2, the upstream and downstream transmitting antennas 108, 110, 408, 410 ($T_u$, $T_d$) emit signals that are received by corresponding receiving antennas 112, 114, 116, 118, 120, 122, 124, 126, 412, 414, 416, 418 ($R_{u1}$, $R_{di}$), where the transmitting and receiving antennas are coupled to the flow pipe 102, 402 in a substantially linear array (e.g., disposed along a longitudinal axis of the pipe). The signal data can be stored in the database 202 of the example flow mixture analyzer 128.

The example method 600 of FIG. 6 includes generating amplitude attenuation (AT) and phase shift (PS) data based on the signal data generated by the transmitting and receiving antenna pair(s) (block 604). For example, the example AT/PS calculator 204 can calculate the (AT, PS) measurements substantially as disclosed in U.S. Pat. No. 8,536,883.

The example method 600 of FIG. 6 includes applying forward model(s) and inversion(s) to determine flow mixture permittivity and/or conductivity ($\varepsilon$, $\sigma$) based on the (AT, PS) measurements (block 606). For example, the forward modeler 206 and the inverse modeler 208 of FIG. 2 communicate to perform and optimization process to minimize differences between the (AT, PS) data predicted by the forward modeler 206 based on the forward model(s) and the measured (AT, PS) data to determine a converged flow mixture permittivity and conductivity ($\varepsilon$, $\sigma$) distribution.

The example method 600 of FIG. 6 includes determining fluid properties liquid holdup and WLR based on the flow mixture permittivity and conductivity ($\varepsilon$, $\sigma$) distribution (block 610). For example, the inverse modeler 208 to calculate variables such as liquid holdup and WLR by applying an inversion to the flow mixture permittivity and conductivity ($\varepsilon$, $\sigma$) distribution.

The example method 600 of FIG. 6 includes determining fluid velocities and flow rates based on cross-correlation analyses of signals between corresponding upstream and downstream transmitting-receiving antenna pairs (block 612). In some examples, reports are generated based on the determined flow rates of the multiphase fluid flowing through the pipe. For example, the flow velocity calculator 210 of FIGS. 2 and 4 can calculate transit time $\tau_t(\Delta T)$ (e.g., using equation (7)), which represents a time delay between signals received at corresponding upstream and downstream receivers $R_{u1}$, Rai, as the fluid flows from upstream to downstream. The flow velocity calculator 210 can determine liquid flow velocities based on signal data from upstream and downstream receivers that are disposed near to the corresponding upstream and downstream transmitters. The flow velocity calculator 210 can determine gas slug flow velocities based on signal data from upstream and downstream receivers that are distal to the corresponding upstream and downstream transmitters. The flow velocity calculator 210 can determine the liquid and gas flow rates based on the velocities and flow models. Alternatively flow rate can be determined based on venturi differential pressure measurement (e.g., using equation (9)).

The example method 600 includes determining if measurement of fluid flowing through the pipe is to continue (block 614). If the measurement of fluid flowing through the pipe is to continue, the example method 600 continues to access signal data to analyze the flow. The example methods 600 ends when the measurement of fluid flowing through the pipe is no longer needed or desired (block 616).

Figure 7:
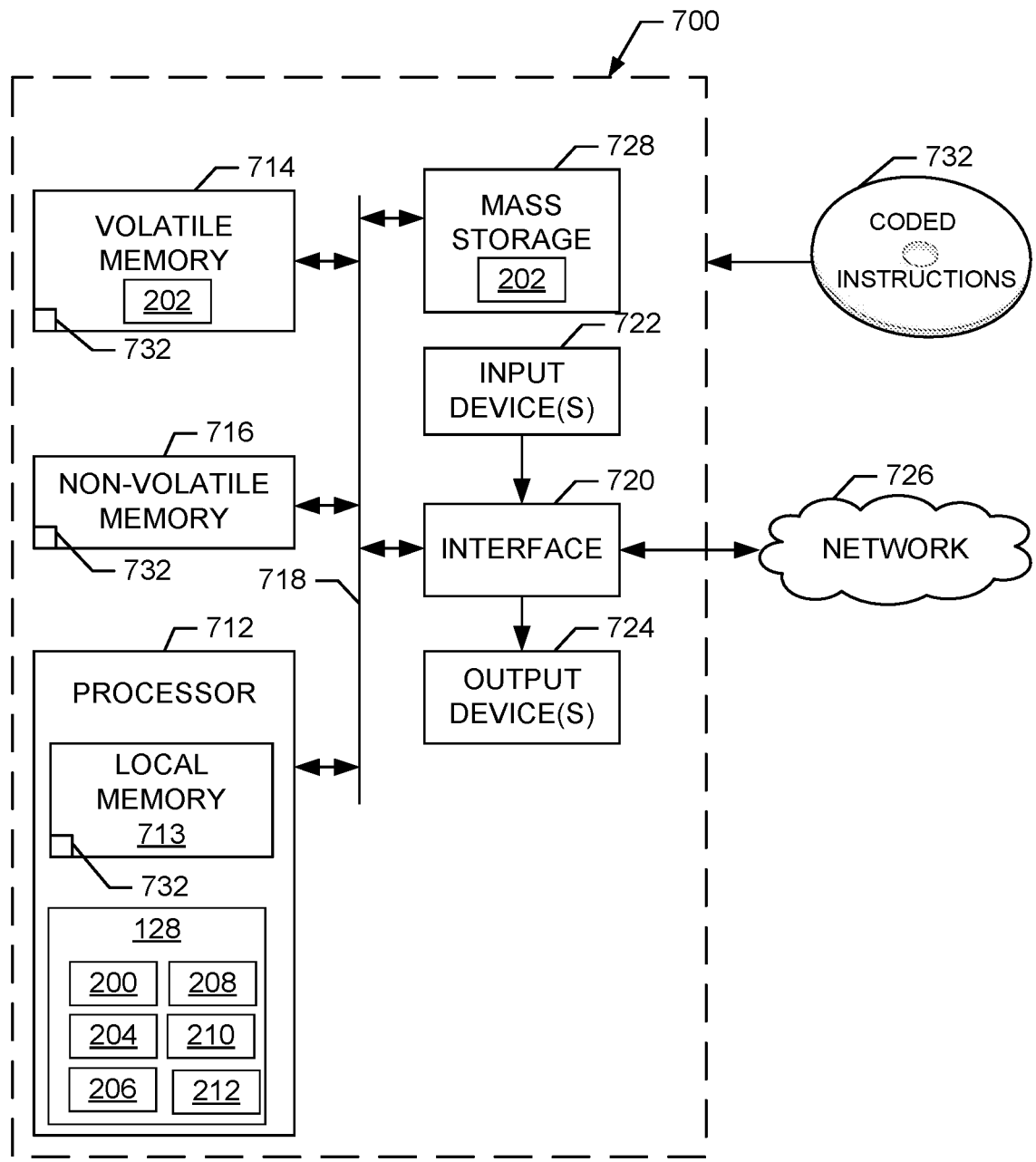
FIG. 7 is a processor platform to execute instructions to implement the methods of FIGS. 3, 5, and/or 6 and/or, more generally, the example flow mixture analyzer of FIG. 2.

FIG. 7 is a block diagram of an example processor platform 700 capable of executing instructions to implement the methods of FIGS. 3, 5, and/or 6 to implement the flow mixture analyzer 128. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the signal transmission manager 200, the AT/PS calculator 204, the forward modeler 206, the inverse modeler 208, the flow velocity calculator 210, and the example communicator 212.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc. For example, the network 726 may be a cloud-based network, which can perform cloud-based data storage, analytics, big data analysis, deep machine learning, etc., to enable multi-well, multi-field reservoir-scale modeling, digital oilfield high-efficiency operations and automation, oil-gas production management and/or optimization based on information obtained and/or processed by the example flow mixture analyzer 128. The example flow mixture analyzer 128 may be an Internet of Things (IoT) device enabled to facilitate capturing, communicating, analyzing, and acting on data generated by networked objects and machines. A plurality of multiphase measurement systems 100 (of FIG. 1), 400 (of FIG. 4), equipped with flow, pressure, and temperature sensors and corresponding network-connectivity, can provide for adaptation of IoT.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

Coded instructions 732 of FIG. 7 may be stored in the mass storage device 728, in the volatile memory 714, in the non-volatile memory 716, and/or on a removable non-transitory computer readable storage medium such as a CD or DVD.

From the foregoing, it will be appreciated that the above-disclosed apparatus, systems, and methods provide for substantially continuous and dynamic analysis of a multiphase fluid flowing in a pipe. In examples disclosed herein, transmitting and receiving electromagnetic antennas are coupled to the pipe in a substantially linear array. Signal data generated rapidly by respective transmitting and receiving antenna pairs is analyzed using an optimization process to efficiently determine flow mixture permittivity and conductivity ($\varepsilon$, $\sigma$) distributions for the fluid. In examples disclosed herein, receiving antennas are spaced apart from the transmitting antenna(s) at different distances to obtain measurements for different portions of a substantially stratified fluid flowing through horizontally oriented pipe or non-stratified fluid flow through a vertically oriented pipe. Cross-correlation analyses of the signals can be performed to determine flow velocities that account for the non-uniform nature of the multiphase fluid. Flow rates of uniform-nature multiphase fluid can be determined based on venturi differential pressure measurement.

In the specification and appended claims: the term "coupled" is used to mean "directly coupled together" or "coupled together via one or more elements." As used herein, the terms "upstream," "downstream," "above" and other like terms indicating relative positions above or below a given point or element are used in this description to more clearly describe some embodiments of the disclosure.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. An apparatus, comprising:
   an internal fluid conduit to provide a cylindrical flow path for a multiphase fluid;
   a first antenna coupled to a wall of the fluid conduit;
   a second antenna coupled to the wall of the fluid conduit, the second antenna to generate first signal data based on a first signal emitted by the first antenna;
   a third antenna coupled to the wall of the fluid conduit, the third antenna to generate second signal data based on a second signal emitted by the first antenna, the first antenna, the second antenna, and the third antenna disposed on a same side of the wall in a linear array relative to an axis of the fluid conduit; and
   a processor, the first antenna, the second antenna, and the third antenna to be communicatively coupled to the processor, the processor to determine one or more of a permittivity or a conductivity of the fluid based on the first signal data and the second signal data.

2. The apparatus of claim 1, wherein the fluid conduit is disposed substantially horizontally.

3. The apparatus of claim 1, wherein the fluid conduit is disposed substantially vertically.

4. The apparatus of claim 1, wherein the first antenna is a first transmitting antenna and the apparatus further including:
   a second transmitting antenna coupled to the wall of the fluid conduit; and
   a fourth antenna coupled to the wall of the fluid conduit, the fourth antenna to generate third signal data based on a signal emitted by the second transmitting antenna, the processor to determine a flow velocity for the fluid based on the first signal data and the third signal data.

5. The apparatus of claim 4, wherein the first transmitting antenna and the second antenna are disposed proximate to an upstream flow of the fluid through the fluid conduit and the second transmitting antenna and the fourth antenna are disposed proximate to a downstream flow of the fluid through the fluid conduit.

6. The apparatus of claim 4, wherein the second transmitting antenna and the fourth antenna are disposed in the linear array.

7. The apparatus of claim 1, further including a gradiomanometer coupled to the fluid conduit, the processor to determine a gas holdup value for the fluid based on differential pressure data generated by the gradiomanometer.

8. The apparatus of claim 1, wherein the second antenna is spaced a first distance from the first antenna and the third antenna is spaced a second distance from the first antenna, the second distance greater than the first distance.

9. The apparatus of claim 1, wherein the first antenna, the second antenna, and the third antenna are flush with the wall of the fluid conduit.

10. An apparatus comprising a processor programmed to implement:
    a calculator to calculate a measured amplitude attenuation data and phase shift data based on signal data received from a plurality of antennas coupled to a wall of an internal conduit during flow of a multiphase fluid through the conduit, the plurality of antennas coupled to the wall of the conduit along an axis of the conduit;
    a forward modeler; and
    an inverse modeler in communication with the forward modeler, the inverse modeler to determine one or more of a permittivity or a conductivity of the multiphase fluid by minimizing a difference between the measured amplitude attenuation data and phase shift data and modeled amplitude attenuation data and phase shift data generated by the forward modeler.

11. The apparatus of claim 10, wherein the forward modeler is to revise the modeled amplitude attenuation data and phase shift data based on the permittivity or the conductivity determined by the inverse modeler.

12. The apparatus of claim 10, further including a flow velocity calculator to calculate a flow velocity of the multiphase fluid based on the signal data.

13. The apparatus of claim 12, wherein the flow velocity calculator is to calculate the flow velocity based on first signal data from a first pair of antennas of the plurality of antennas and second signal data from a second pair of antennas of the plurality of antennas.

14. The apparatus of claim 12, wherein the flow velocity calculator is to calculate a flow rate of the multiphase fluid based on differential pressure data.

15. The apparatus of claim 10, wherein the inverse modeler is to calculate one or more of a liquid holdup value, a water-in-liquid ratio, or a water conductivity value for the multiphase fluid based one or more of the permittivity or the conductivity.

16. The apparatus of claim 15, wherein the inverse modeler is to calculate the one or more of the liquid holdup value, the water-in-liquid ratio, or the water conductivity value based on a second model generated by the forward modeler.

17. An apparatus comprising:
    a first transmitting antenna and a second transmitting antenna coupled to a wall of an internal pipe along an axis of the pipe;
    a first receiving antenna and a second receiving antenna coupled to the wall of the pipe along the axis of the pipe,
       the first receiving antenna to receive a first signal at a first spacing from the first transmitting antenna,
       the second receiving antenna to receive a second signal at a second spacing from the first transmitting antenna;
       the first receiving antenna to receive a third signal at the second spacing from the second transmitting antenna,
       the second receiving antenna to receive a fourth signal at the first spacing from the second transmitting antenna, the first spacing different from the second spacing; and
    a processor, the first transmitting antenna, the second transmitting antenna, the first receiving antenna and the second receiving antenna to be communicatively coupled to the processor, the processor to determine a property of a multiphase fluid flowing through the pipe based on the first signal, the second signal, the third signal, and the fourth signal.

18. The apparatus of claim 17, wherein the first transmitting antenna and the first receiving antenna are disposed proximate to an upstream flow of the fluid, the first receiving antenna being disposed closer to the upstream flow of the fluid than the first transmitting antenna and the second transmitting antenna and the second receiving antenna are disposed proximate to a downstream flow of the fluid, the second receiving antenna being disposed closer to the downstream of the fluid than the second transmitting antenna.

19. The apparatus of claim 17, wherein the property is one or more of a permittivity or a conductivity of the multiphase fluid and the processor is programmed to implement:
   a calculator to calculate a measured amplitude attenuation data and phase shift data based on the first signal, the second signal, the third signal, and the fourth signal;
   a forward modeler; and
   an inverse modeler in communication with the forward modeler, the inverse modeler to determine one or more of the permittivity or the conductivity of the multiphase fluid by minimizing a difference between the measured amplitude attenuation data and phase shift data and modeled amplitude attenuation data and phase shift data generated by the forward modeler.

20. The apparatus of claim 19, wherein the forward modeler is to revise the modeled amplitude attenuation data and phase shift data based on the permittivity or the conductivity determined by the inverse modeler.

21. The apparatus of claim 10, wherein the inverse modeler is to calculate one or more of a liquid holdup value, a water-in-liquid ratio, or a water conductivity value for the multiphase fluid based one or more of the permittivity or the conductivity.

22. The apparatus of claim 18, comprising a third receiving antenna and a fourth receiving antenna coupled to the wall of the pipe along the axis of the pipe,
   the third receiving antenna being disposed closer to the upstream flow of the fluid than the first receiving antenna; and
   the fourth receiving antenna being disposed closer to the downstream antenna.

23. The apparatus of claim 22, wherein the first receiving antenna is spaced a first distance from the first transmitting antenna and the third receiving antenna is spaced a second distance from the first transmitting antenna, the second distance greater than the first distance; and
   the second receiving antenna is spaced the first distance from the second transmitting antenna and the fourth receiving antenna is spaced the second distance from the second transmitting antenna.

* * * * *